US011972244B2

United States Patent
Zmijewski et al.

(10) Patent No.: US 11,972,244 B2
(45) Date of Patent: Apr. 30, 2024

(54) METHOD AND APPARATUS FOR IMPROVING A MOBILE APPLICATION

(71) Applicant: IRON GAMING LIMITED, St. Julians (MT)

(72) Inventors: Peter Marek Zmijewski, Singapore (SG); Scott Matthew Dowdell, Singapore (SG)

(73) Assignee: IRON GAMING LIMITED, St. Julians (MT)

( * ) Notice: Subject to any disclaimer, the term of this patent is extended or adjusted under 35 U.S.C. 154(b) by 161 days.

(21) Appl. No.: 17/525,186

(22) Filed: Nov. 12, 2021

(65) Prior Publication Data
US 2022/0156058 A1    May 19, 2022

(30) Foreign Application Priority Data

Nov. 13, 2020   (SG) ............................ 10202011288X

(51) Int. Cl.
*G06F 8/65* (2018.01)
*G06N 3/08* (2023.01)
(Continued)

(52) U.S. Cl.
CPC ................ *G06F 8/65* (2013.01); *G06N 3/08* (2013.01); *G06V 10/764* (2022.01); *G06V 10/82* (2022.01);
(Continued)

(58) Field of Classification Search
CPC .......... G06F 9/455; G06F 11/261; G06F 8/65; G06F 16/29; G06F 11/3409;
(Continued)

(56) References Cited

U.S. PATENT DOCUMENTS

2015/0105153 A1\*   4/2015   Xu ..................... A63F 13/798
                                                            463/31
2016/0210173 A1\*   7/2016   Bookman ............. G06F 9/455
(Continued)

FOREIGN PATENT DOCUMENTS

CN         1996298 A   *   7/2007
CN       105574000 A       5/2016
(Continued)

OTHER PUBLICATIONS

Zou; translated CN 1996298A; 18 pages (Year: 2007).\*
(Continued)

*Primary Examiner* — S. Sough
*Assistant Examiner* — Cuong V Luu
(74) *Attorney, Agent, or Firm* — Klarquist Sparkman, LLP

(57) ABSTRACT

A method and apparatus for improving mobile application that enable: unpacking a first mobile application to obtain contents including codes and resource data of the first mobile application; setting a name space for the resource data of the first mobile application and of a second mobile application; assembling the codes of the first and second mobile applications; and packing the assembled codes of the first and second mobile applications, the resource data of the first and second mobile applications, and data of the name space to create an improved mobile application, wherein the method further comprises capturing images of the improved mobile application; using neural network to determine a category for the captured images; and extracting features in the captured images according to the category to monitor status or gather data from the improved mobile application.

38 Claims, 8 Drawing Sheets

(51) Int. Cl.
*G06V 10/764* (2022.01)
*G06V 10/82* (2022.01)
*H04M 1/72406* (2021.01)
*H04M 1/72427* (2021.01)
*H04W 4/60* (2018.01)

(52) U.S. Cl.
CPC ... *H04M 1/72406* (2021.01); *H04M 1/72427* (2021.01); *H04W 4/60* (2018.02)

(58) Field of Classification Search
CPC .... G06F 11/3055; G06F 9/5055; H04W 4/60; H04M 1/72406; H04M 1/72427; G06V 10/82; G06V 10/764; G06N 3/08
See application file for complete search history.

(56) References Cited

U.S. PATENT DOCUMENTS

| | | | | |
|---|---|---|---|---|
| 2016/0359948 A1* | 12/2016 | Raabe | .................... | H04L 67/025 |
| 2017/0242664 A1 | 8/2017 | Chung et al. | | |
| 2017/0278351 A1* | 9/2017 | Dominic | ............. | G07F 17/3255 |
| 2018/0143822 A1* | 5/2018 | VanBlon | .................... | G06F 8/65 |
| 2019/0056922 A1 | 2/2019 | Cooper et al. | | |
| 2019/0349469 A1* | 11/2019 | Skogen | ................ | G06F 11/3423 |
| 2020/0104120 A1* | 4/2020 | Speer | .................... | G06F 11/3664 |

FOREIGN PATENT DOCUMENTS

| | | |
|---|---|---|
| CN | 107402792 A | 11/2017 |
| CN | 108829405 A | 11/2018 |
| WO | 2019/032045 A1 | 5/2018 |

OTHER PUBLICATIONS

Omolade Saliu et al.; Supporting Software Release Planning Decisions for Evolving Systems; IEEE; 11 pages; retrieve on Dec. 22, 2023 (Year: 2005).*

Kento Goto et al.; Mobile Web Application Generation Features for SuperSQL; ACM; 8 pages; retrieve on Dec. 22, 2023 (Year: 2016).*

Intellectual Property Office of Singapore, Search Report, Singapore Patent Application No. 10202011288X, 2 pages. Apr. 28, 2021.

Intellectual Property Office of Singapore, Written Opinion, Singapore Patent Application No. 10202011288X, 6 pages. Apr. 28, 2021.

* cited by examiner

METHOD AND APPARATUS FOR IMPROVING A MOBILE APPLICATION

FIELD

The present invention relates to a method and an apparatus for improving a mobile application. In particular, an improved mobile application is created from more than one mobile applications. In addition, the present invention also relates to an apparatus configured to operate an improved mobile application.

BACKGROUND

Once a mobile application is launched for a particular mobile platform such as IPhone Operating System (IOS) or Android Operating System (Android), updates to the mobile application to modify/add functionalities can only be provided by the developer of the mobile application. Some developers do not provide timely updates to provide sufficient/useful functionalities for mobile applications developed by them, leading to low usage statistics, and subsequently the decommissioning of mobile applications because of poor usage.

Furthermore, as some mobile applications become very popular, there may arise a need to access such mobile applications across many operating platforms, including that of a personal computer (e.g. with operating systems such as Windows and Mac OS etc.), smart television, television box, game consoles, and the like, in addition to the operating platforms of mobile devices including tablet devices, smartphones and the like. There will also be a demand for timely updates of useful functionalities for such popular mobile applications.

SUMMARY

According to an example of the present disclosure, there are provided an apparatus and method as claimed in the independent claims. Some optional features are defined in the dependent claims.

DETAILED DESCRIPTION

Figure 1:
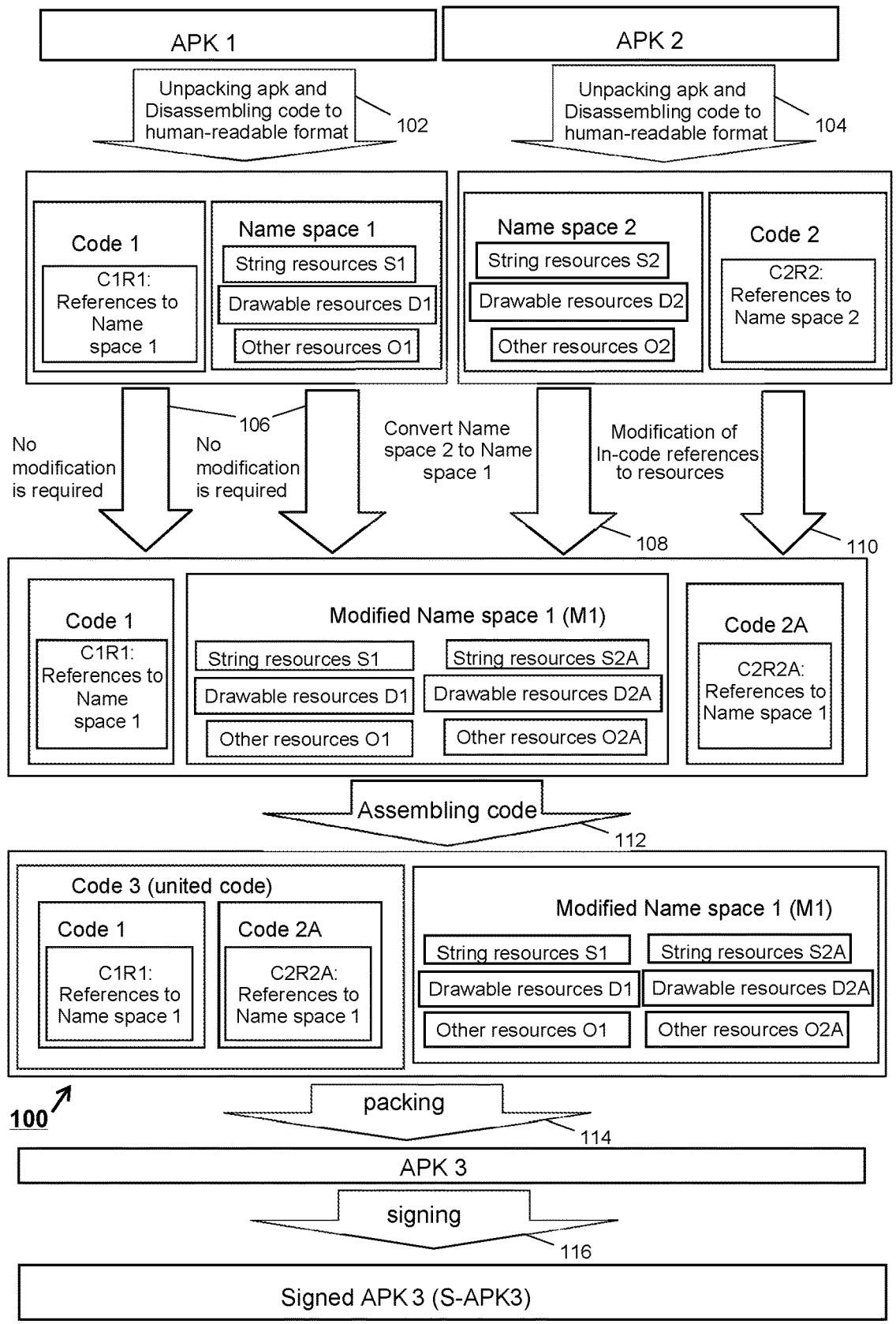
FIG. 1 shows a process diagram illustrating how more than one mobile applications can be combined to create an improved mobile application according to an example of the present disclosure.

An example of the present disclosure includes an apparatus (A1) and a method for improving a mobile application, and an apparatus (or user device or user machine) (A2) configured to run or operate the improved mobile application. The apparatus A1 and the apparatus A2 may or may not be the same apparatus.

The mobile application in this case refers to a mobile application or app that is configured to run in an operating system of a mobile device (also known as "mobile operating system"), such as a smartphone, a tablet device, and the like. For example, the mobile operating system includes iPhone Operating System, Android operating system, and the like.

Examples of the apparatus (A2) configured to run or operate the improved mobile application include a personal computer (e.g. with operating systems such as Windows and Mac OS etc.) including a desktop computer, smart television, television box (e.g. Android box), game consoles, video consoles, and the like, and mobile devices including tablet devices, smartphones, laptops, and the like. If the operating system of the apparatus (A2) is not natively configured to run the improved mobile application, an emulator can be provided to the apparatus (A2) to enable the apparatus (A2) to run the improved mobile application.

Other than using a standard App store (e.g. Google Play Store or Apple App Store) native to each mobile operating system, a mobile application functioning as a bespoke mobile application store can be provided to enable user access to the improved mobile application. Such mobile application functioning as the mobile application store can be downloaded and installed on the apparatus that is configured to run the improved mobile application. The bespoke mobile application store can list one or more improved mobile applications, allow user selection of the one or more improved mobile applications for running or updating, and allow the one or more improved mobile applications to be searched. The one or more improved mobile applications can be sorted by category, genre, theme, alphabetical order, popularity, etc. The bespoke mobile application store can also provide statistics pertaining to the one or more improved mobile applications. The statistics may relate to popularity, user usage data, number of downloads, etc. The mobile application of the bespoke mobile application store can be run via an emulator if the apparatus has an operating system that is not natively configured to run mobile applications.

Details of an example applicable to each of the apparatus (A1) and (A2) is described as follows. The apparatus of the present example may be a user or client device and can communicate with one or more servers via the Internet. The apparatus of the present example may have one or more of the following components in electronic communication via a bus:

1. a display;
2. non-volatile memory;
3. random access memory ("RAM");
4. N processing components ("one or more processors");
5. a transceiver component that includes N transceivers;
6. user controls i.e. user input devices;
7. optionally, image capturing components;
8. optionally, audio signal capturing components;
9. optionally, audio speakers; and
10. Input/Output interfaces for connecting to the user input devices (such as mouse, joystick, keyboard, sensors for detecting user gestures, and the like), the audio speakers, display, image capturing components and/or audio signal capturing components.

The display generally operates to provide a presentation of graphical content (e.g. graphical contents of the mobile device software, the one or more links, announcements and/or advertisements herein described) to a user, and may be realized by any of a variety of displays (e.g., CRT, LCD, HDMI, micro-projector and OLED displays). And in general, the non-volatile memory functions to store (e.g., persistently store) data and executable code, instructions, program or software including code, instructions, program or software that is associated with the functional components of a browser component and applications. In one example, the code, instructions, program or software may provide an emulator for running mobile applications, if the operating system of the apparatus is not natively configured to run mobile applications. In some examples, the code, instructions, program or software may include bootloader code, modem software, operating system code, file system code, and code to facilitate the operation of the apparatus as well as other components well known to those of ordinary skill in the art that are not depicted for simplicity.

In many implementations, the non-volatile memory is realized by flash memory (e.g., NAND or NOR memory), but it is certainly contemplated that other memory types may be utilized as well. Although it may be possible to execute the code from the non-volatile memory, the executable code in the non-volatile memory is typically loaded into RAM and executed by one or more of the N processing components.

The N processing components (or "one or more processors") in connection with RAM generally operate to execute the instructions stored in non-volatile memory to effectuate the functional components. As one skilled in the art (including ordinarily skilled) will appreciate, the N processing components may include a video processor, modem processor, DSP, graphics processing unit (GPU), and other processing components. In some implementations, the processing components are configured to determine a type of software activated on the apparatus.

The transceiver component may include N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks, 5G network etc.), and other types of communication networks. In some implementations, the communication of the transceiver component with communication networks enables a location of the apparatus to be determined.

The image capturing components and the audio signal capturing components that are optionally available can also be utilised to input user controls, as defined control settings.

The processing of the executable code, instructions, program or software may be performed in parallel and/or sequentially. The executable code, instructions, program or software may be stored on any machine or computer readable medium that may be non-transitory in nature. The computer readable medium may include storage devices such as magnetic or optical disks, memory chips, or other storage devices suitable for interfacing with a computer or mobile device. The machine or computer readable medium may also include a hard-wired medium, or wireless medium. The executable code, instructions, program or software when loaded and executed effectively results in the apparatus that implements steps of methods in examples herein described.

FIG. 1 shows an example of a process or method 100 illustrating how more than one mobile applications are combined to create an improved mobile application. The apparatus (A1) mentioned above can be used to perform this process 100. In this example, two mobile applications APK1 and APK2 executable in a mobile operating system, Android, are combined to create an improved APK3. APK 1, APK2 and APK3 each refers to an APK file. An APK file is essentially a mobile app. It should be appreciated that in other examples, more than two mobile application may also be combined in a similar manner and the mobile device operating system is not limited to Android. This can also be applicable to other operating systems such as IPhone Operating System (IOS) as well.

Firstly, steps 102 and 104 are performed. In these steps, APK1 and APK2 are each unpacked and disassembled (or converted) to obtain codes, Code 1 and Code 2 respectively, and specific name spaces, Name space 1 and Name space 2 respectively, that are in a human readable format. Specifically, in the present example, machine code, in particular Dalvik/ART virtual machine byte-code (i.e. JAVA code compiled for Android), of each of APK1 and APK2 are disassembled into Smali format. Smali format is a human-readable format to represent code compiled for Android virtual machines.

The step of disassembling or conversion of the machine code to a human readable format facilitates any required modification to the unpacked contents of APK1 and APK2. It would be easier for a human to modify the contents in human readable format. Although disassembling or conversion into human readable format is described in the present example, the need for this depends on the situation. If the process 100 is automated by a machine, and the machine is configured to work with such human readable format, disassembling or conversion into the human readable format would be necessary. However, if the process 100 is automated by a machine, and the machine is capable of reading machine code and modifying such machine code if required, disassembling or conversion into the human readable format is unnecessary.

In the present disclosure, a name space refers to a set of signs (names) that are used to identify and refer to objects of various kinds. A name space ensures that all of a given set of objects have unique names so that they can be easily identified. Each Name space (e.g. Name space 1 and 2) described herein may contain naming data of resources. Such resources may refer to additional files and/or static content that a code of a mobile application uses, such as bitmaps, layout definitions, user interface strings, animation instructions, and more. In the present disclosure, code or codes of a mobile application refer to instructions executable by one or more processors to operate an apparatus to run the mobile application.

Specifically, in the present example, Name space 1 associated with APK 1 includes naming data pertaining to string resources S1, Drawable resources D1 and Other resources O1 of APK 1. Name space 2 associated with APK 2 includes naming data pertaining to Sting resources S2, Drawable resources D2 and Other resources O2 of APK 2.

Code 1 includes codes of APK1 that have references to the names of the String resources S1, Drawable resources D1 and Other resources O1 of APK1 in Name space 1. Such references in Code 1 are denoted as C1R1 in the present disclosure.

Code 2 includes codes of APK2 that have references to the names of the String resources S2, Drawable resources D2 and Other resources O2 of APK2 in Name space 2. Such references in Code 2 are denoted as C2R2 in the present disclosure.

In general, String resources S1 and S2 relates to resources pertaining to text styles, format and the like, Drawable resources D1 and D2 relates to resources defining to graphics being displayed, and Other resources O1 and O2 relates to resources other than String resources S1 and S2 and Drawable resources D1 and D2.

In the case of Google's Android Operating System, String Resources S1 and S2 as well as String Resources described with reference to FIG. 8 may each refer to one or more string resources providing text strings for a mobile application with optional text styling and formatting. There are three types of resources that can provide a mobile application with strings:
1) String—An XML resource that provides a single string.
2) String Array—An XML resource that provides an array of strings.
3) Quantity Strings (Plurals)—An XML resource that carries different strings for pluralization.

Drawable resources D1 and D2 as well as String Resources described with reference to FIG. 8 may each refer to a general concept for a graphic that can be drawn to a screen (i.e. a display of an apparatus for displaying graphics) and which a mobile application can retrieve with APIs such as getDrawable(int) or apply to another XML resource with attributes such as android:drawable and android:icon. Drawable resources D1 and D2 can include several different types of drawables as follows.

Bitmap File—A bitmap graphic file (.png, .jpg, or .gif). A BitmapDrawable resource that wraps a bitmap and can be tiled, stretched, or aligned can be created and be part of each of the Drawable resources D1 and D2.

Nine-Patch File—A PNG file with stretchable regions to allow image resizing based on content (0.9.png). A Nine-PatchDrawable resource, which is a resizeable bitmap with stretchable areas that one can define, can be created and be part of each of the Drawable resources D1 and D2.

Layer List—A Drawable that manages an array of other Drawables. These are drawn in array order, so the element with the largest index is be drawn on top. A LayerDrawable resource can be created and be part of each of the Drawable resources D1 and D2.

State List—An XML file that references different bitmap graphics for different states (for example, to use a different image when a button is pressed). A StateListDrawable resource, which enables one to assign a number of graphic images to a single Drawable and swap out a visible item by a string ID value, can be created and be part of each of the Drawable resources D1 and D2.

Level List—An XML file that defines a drawable that manages a number of alternate Drawables, each assigned a maximum numerical value. A LevelListDrawable resource can be created and be part of each of the Drawable resources D1 and D2.

Transition Drawable—An XML file that defines a drawable that can cross-fade between two drawable resources. A TransitionDrawable resource, which is an extension of LayerDrawables that is intended to cross-fade between first and second layers, can be created.

Inset Drawable—An XML file that defines a drawable that insets another drawable by a specified distance. This is useful when a View needs a background drawable that is smaller than the View's actual bounds.

Clip Drawable—An XML file that defines a drawable that clips another Drawable based on this Drawable's current level value. A ClipDrawable resource can be created and be part of each of the Drawable resources D1 and D2.

Scale Drawable—An XML file that defines a drawable that changes the size of another Drawable based on its current level value. A ScaleDrawable resource can be created and be part of each of the Drawable resources D1 and D2.

Shape Drawable—An XML file that defines a geometric shape, including colors and gradients. A GradientDrawable resource, which is a Drawable with a color gradient for buttons, backgrounds, etc., can be created and be part of each of the Drawable resources D1 and D2.

Other resources O1 and O2 may each refer to, for instance, the following resources.

Animation Resources—These resources define pre-determined animations.

Color State List Resource—This resource defines color resources that changes based on a View state.

Layout Resource—This resource defines the layout for a User Interface of a mobile application.

Menu Resource—This resource defines the contents of menus in a mobile application.

Style Resource—This resource defines the look and format for User Interface elements.

Font Resources—This resource defines font families and includes custom fonts in XML.

Furthermore, there are Resource Types that defines certain primitive values as static resources, including the following:
Bool—An XML resource that carries a boolean value.
Color—An XML resource that carries a color value (a hexadecimal color).
Dimension—An XML resource that carries a dimension value (with a unit of measure).
ID—An XML resource that provides a unique identifier for application resources and components.
Integer—An XML resource that carries an integer value.
Integer Array—An XML resource that provides an array of integers.
Typed Array—An XML resource that provides a TypedArray (which one can use for an array of drawables).

In the present example, APK1 is an existing mobile application to be improved. APK2 is a mobile application containing new features and/or functionalities to be added to APK1 to improve it. "feature" and "functionality" and their plural forms are interchangeable terms in the present disclosure. No modification is made to the Code 1 and Name space 1 of APK1. Any required modification to enable the final improved mobile application APK3 to work is made to the Code 2 and Name space 2 of APK2. Making no or minimum modification to one of APK1 or APK2, and making all modifications to the other APK2 or APK1 respectively, is an efficient way to create APK3.

Specifically, with reference to FIG. 1, in step 106, no modification is made to Code 1 and Name Space 1. In step 108, Name space 2 is converted or modified in view of Name space 1. Specifically, any conflicts in the naming of resources are resolved. Such conflicts have to be resolved, otherwise, the final improved mobile application APK3 may not work properly. For instance, if the name of a resource in Name space 1 is the same as a resource in Name space 2, the resource in Name space 2 with the same name is modified to have a different name. In step 110, References to Name space 2 (C2R2) is modified according to any modification to the Name space 2. For instance, if the name of a resource is changed to a new unique name in Name space 2, references to this resource in Code 2 is modified to refer to the new unique name. After step 108, Name space 2 no longer exists and its resources S2, D2 and O2 are modified to be associated with Name space 1. In some cases, some resources in Name space 2 may have to be overwritten by resources in Name space 1.

Assuming that all the resources in Name space 2 needs to be modified at step 108, they are given new references String resources S2A, Drawable resources D2A and Other resources O2A respectively in FIG. 1 to indicate that they have been modified. The modified C2R2 is given a new reference C2R2A, which indicates that C2R2 has been modified to refer to and/or be associated with Name space 1. Code 2, which has been modified to comprise C2R2A, is given a new reference Code 2A.

As a result of the modifications to Code 2 and the conversion or modification of Name space 2 to refer to and/or be associated with Name space 1, a Modified Name space 1 (M1) comprising the resources S1, D1, O1, S2A, D2A, and O2A is created.

Code 1, Code 2A comprising C2R2A, and Modified Name space 1 (M1) are assembled at step 112. After code assembly, Code 1 and Code 2A are unified as Code 3 with all references in Code 3 referring to Modified Name space 1 (M1).

Thereafter, Code 3 and the Modified Name space 1 (M1) are packed to create APK3 at step 114.

Optionally, as required, the APK3 can be sent for code signing at step 116 to get a signed APK3 (S-APK3). Code signing is a process of digitally signing executables and scripts to confirm a software author and guarantees that the code has not been altered or corrupted since it was signed. A signed APK refers to a .APK package that went through the process of Code signing.

Alternatively, in other examples, it could be that the code 1 and name space 1 of APK1 are modified and the code 2 and name space 2 of APK2 are not modified to enable the improved mobile application APK3 to work. Or, it could be that both the codes 1 and 2 and name spaces 1 and 2 of APK1 and APK2 respectively are modified.

Furthermore, in another example, APK2 may be provided directly in unpacked and disassembled format and step 104 does not have to take place.

In yet another example, instead of incorporating Name space 2 into Name space 1 as described above, a new Name space 3 may be created but this requires the modification of all of Code 1 and Name space 1, and Code 2 and Name space 2 to refer to or be associated with the new Name space 3.

Figure 8:
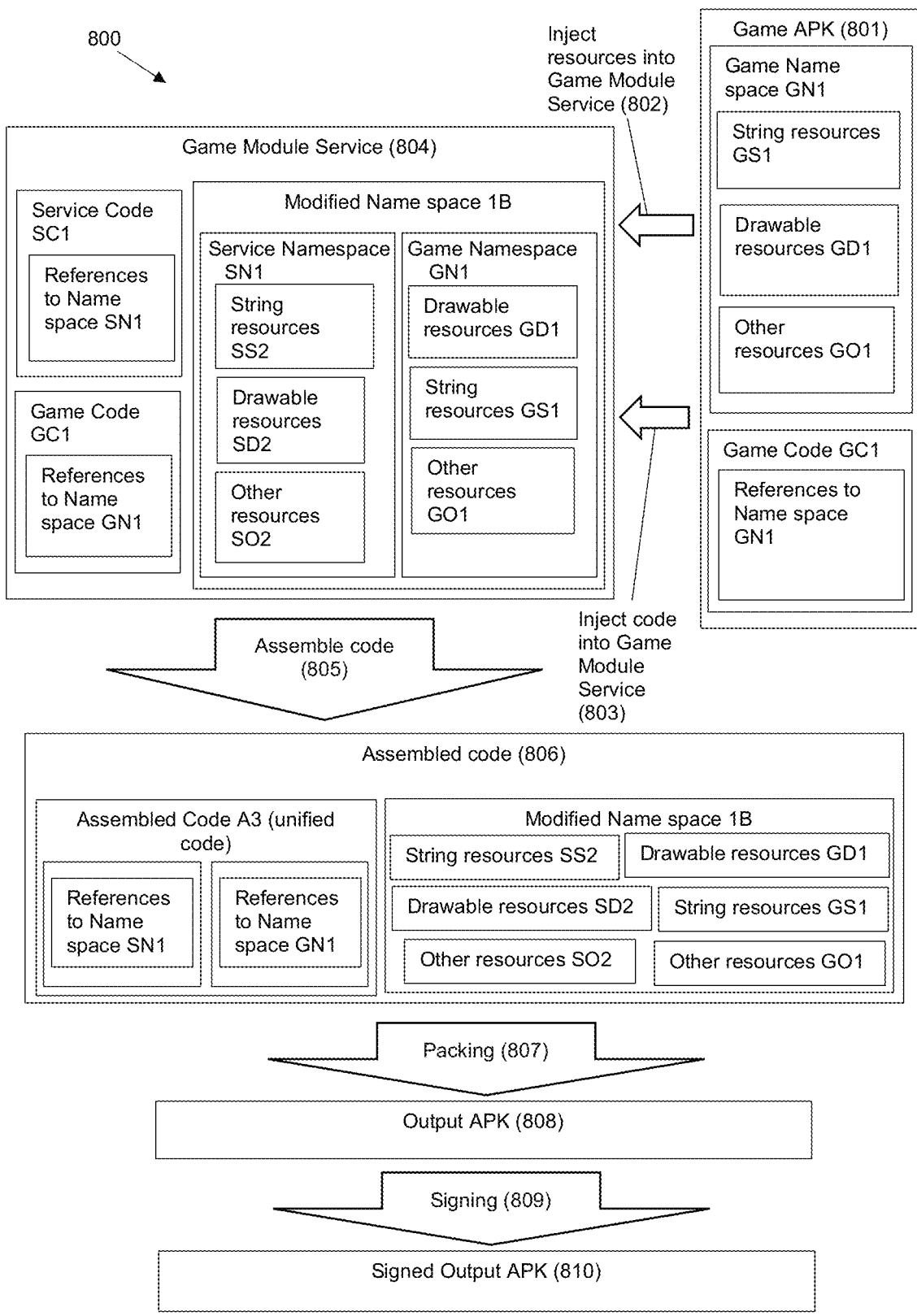
FIG. 8 shows a process diagram illustrating how an existing mobile application can be improved according to an example of the present disclosure.

FIG. 8 shows an example of a process or method 800 illustrating how one existing game mobile application, in this case, Game APK 801, is combined with a Game Module Service 804 to create an improved mobile application, which is a Signed Output APK 810. Each of these APKs mentioned is an APK file, which is essentially a mobile app for the Android Operating system. The apparatus (A1) mentioned above can be used to perform this process 800. In a similar manner, the process 800 may be applied to a suitable mobile device operating system that is not Android based as well. For instance, the general concept can also be applied to other operating systems such as IPhone Operating System (IOS).

An existing Game APK 801 is the input for the process 800. The Game APK 801 is firstly unpacked and disassembled (or converted) to obtain Game Code GC1 and Game Namespace GN1 that are in a human readable format. Specifically, in the present example, machine code, in particular Dalvik/ART virtual machine byte-code (i.e. JAVA code compiled for Android), of the Game APK 801 is disassembled into Smali format. Smali format is a human-readable format to represent code compiled for Android virtual machines.

Although disassembling or conversion into human readable format is described above for the present example, the need for this depends on the situation. If the process 800 is automated by a machine, and the machine is configured to work with such human readable format, disassembling or conversion into the human readable format would be necessary. However, if the process 800 is automated by a machine, and the machine is capable of reading machine code of the Game APK 801, disassembling or conversion into the human readable format is unnecessary.

In the example of FIG. 8, Game APK 801 is an existing mobile application to be improved. Different from the example of FIG. 1, there is provided a Game Module Service 804, which comprises data relating to codes and name spaces that are configured to provide improvements to the existing Game APK 801. The improvements are new features and/or functionalities. The Game Module Service 804 is not an apk file that requires disassembling. The Game Module Service 804 is supplied with Service Code SC1 and Service Namespace SN1, which can be in a human-readable format or machine readable format for processing depending on the machine used for processing.

Similar to the example of FIG. 1, each of all the name spaces described for the example of FIG. 8 refers to a set of signs (names) that are used to identify and refer to objects of various kinds. A name space ensures that all of a given set of objects have unique names so that they can be easily identified. Each Name space described herein may contain naming data of resources. Such resources may refer to additional files and/or static content that a code of a mobile application uses, such as bitmaps, layout definitions, user interface strings, animation instructions, and more. Furthermore, code or codes of a mobile application refer to instructions executable by one or more processors to operate an apparatus to run the mobile application.

Specifically, in the present example, Game Namespace GN1 associated with Game APK 801 includes naming data pertaining to String resources GS1, Drawable resources GD1 and Other resources GO1 of Game APK 801.

The Game Code GC1 includes codes of Game APK 801 that have references to the names of the String resources GS1, Drawable resources GD1 and Other resources GO1 in Game Namespace GN1.

Specifically, the Game Module Service 804 comprises the Service Namespace SN1 that includes naming data pertaining to String resources SS2, Drawable resources SD2 and Other resources SO2 of the Game Module Service 804.

The Service Code GC1 includes codes of the Game Module Service 804 that have references to the names of the String resources SS2, Drawable resources SD2 and Other resources SO2 in the Service Namespace SN1.

In general, String resources GS1 and SS2 relate to resources pertaining to text styles, format and the like. Drawable resources GD1 and SD2 relate to resources defining graphics being displayed, and Other resources GO1 and SO2 relate to resources other than String resources GS1 and SS2, and Drawable resources GD1 and SD2.

No modification is made to the Game Code GC1 and Game Name Space GN1 of the Game APK 801. Any required modification to enable the final improved mobile application i.e. the Signed Output APK 810 to work is made to the Service Code SC1 and Service Namespace SN1 of the Game Module Service 804. Making no modification to the Game APK 801, and making all required modifications to the Game Module Service 804, is an efficient way to create the Signed Output APK 810.

Specifically, with reference to FIG. 8, no modification is made to the Game Code GC1 and Game Name Space GN1. The Game Name Space GN1 and Game Code GC1 are injected at steps 802 and 803 respectively into the Game Module Service 804.

The Game Module Service 804 receives the Game Namespace GN1 as input, and, if necessary, the Service Namespace SN1 is modified but the Game Namespace GN1 remains unchanged. For instance, any conflicts in the naming of resources between the Service Namespace SN1 and the Game Namespace GN1 are resolved by modifying the names of the resources in the Service Namespace SN1. Such conflicts have to be resolved, otherwise, the final improved mobile application, the Signed Output APK3 810, may not work properly. After the Service Namespace SN1 is modified as required, the Service Namespace SN1 and the Game Namespace GN1 are combined as part of a common Modified Name space 1B.

Similarly, the Game Module Service 804 receives the Game Code GC1 as input, and, if necessary, the Service Code SC1 is modified to enable the final improved mobile application, which is the Signed Output APK3 810, to work properly with the improvements but the Game Code GC1 remains unchanged.

The Service Code SC1 and Game Code GC1, and the Modified Name space 1B are assembled at step 805 to form Assembled code 806 comprising Assembled Code A3 and Modified Name space 1B. After code assembly, the Service Code SC1 and Game Code GC1 are unified as the Assembled Code A3 with all references referring to resources in the common Modified Name space 1B that is set up.

Thereafter, the Assembled Code A3 and the Modified Name space 1B are packed at a step 807 to create an Output APK 808.

Optionally, as required, the Output APK 808 can be sent for code signing at step 809 to get the Signed Output APK 810. Code signing is a process of digitally signing executables and scripts to confirm a software author and guarantees that the code has not been altered or corrupted since it was signed. The Signed Output APK 810 refers to a .APK package that went through the process of Code signing.

In the example of FIG. 1, as APK2 is a mobile application containing new features and/or functionalities to be added to APK1, APK1 can be said to be an original mobile application. Hence, in general, the file/package size of APK2 will be smaller than the file/package size of APK1. This means that it is more efficient to modify Code 2 and Name space 2, which are of smaller size, as compared to modifying the Code 1 and Name space 1 of APK1, which are of larger size. Furthermore, APK1 may comprise core and/or existing features and functionalities that a user most desires from APK1. Hence, in this case, it is preferable not to modify APK1 to prevent malfunction of the core and/or existing features and functionalities of APK1 due to errors in the modification. In another scenario, APK1 may be developed by a first developer and APK2 may be developed by a different second developer, and the second developer is tasked to provide improvements to APK1 via APK2. In this case, the second developer of APK2 may not be familiar with the codes and resources of APK1. Hence, it is better not to modify APK1 but to only modify APK2.

One way to enable a user to have access to the improved mobile application APK3, S-APK3, Output APK 808, or Signed Output APK 810 is to have it provided in the standard App store of the respective mobile operating systems (E.g. Apple App Store or Google Play Store).

Figure 2:
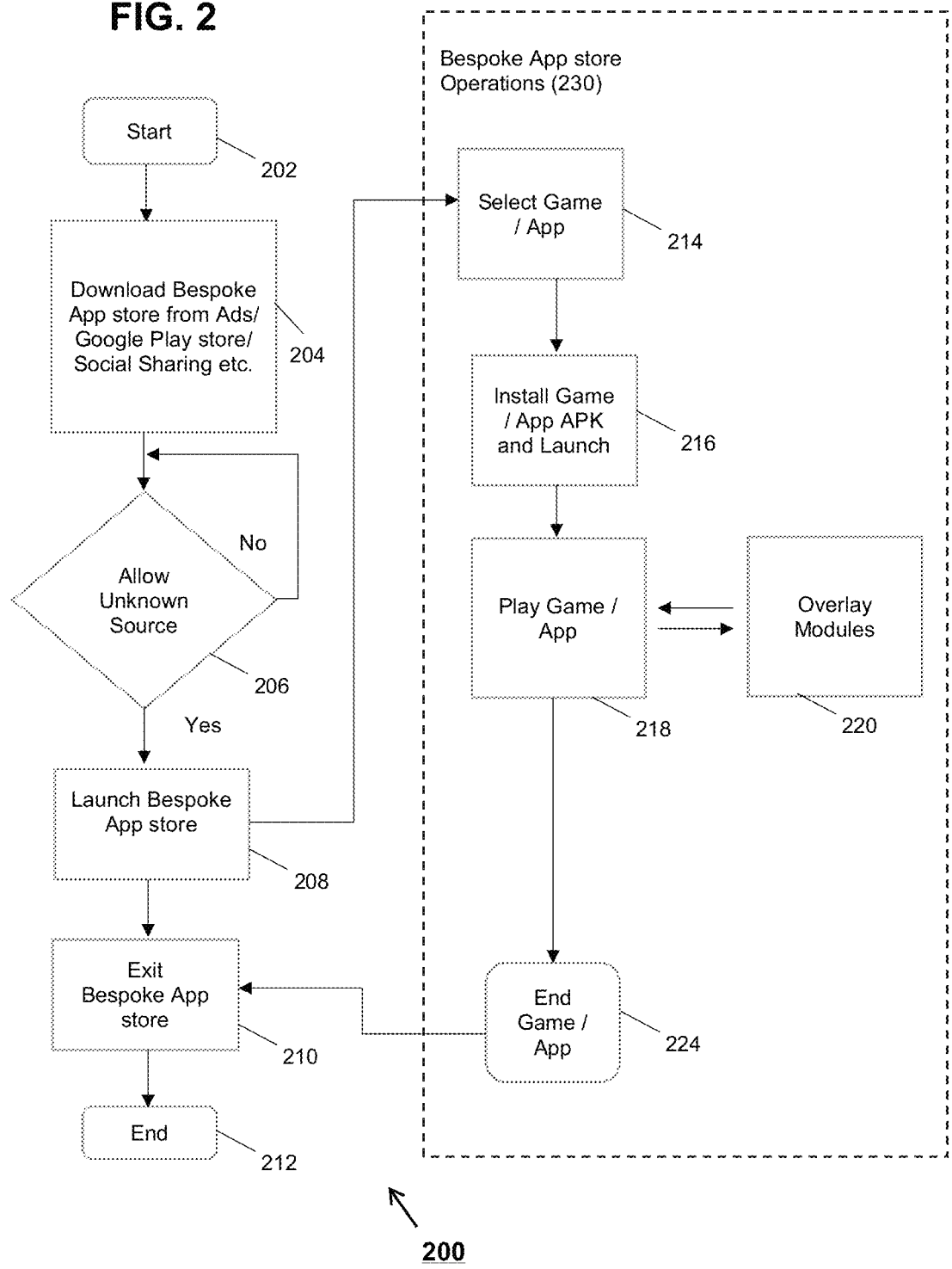
FIG. 2 shows a flowchart on how an improved mobile application can be run on an apparatus according to an example of the present disclosure.

FIG. 2 shows a flowchart 200 illustrating an example of an alternative way for a user to access and run the improved mobile application such as the APK3 or S-APK3 of FIG. 1, or Output APK 808 or Signed Output APK 810 of FIG. 8 on an apparatus configured to run or operate the improved mobile application (e.g. apparatus (A2) mentioned above). Specifically, this alternative way uses the mobile application functioning as a customised or Bespoke mobile application store (in short "Bespoke App Store") as described earlier. In the example of FIG. 2, it is assumed that the mobile operating system is Android. It is appreciated the same work flow in the flow chart 200 can be applied to other mobile operating systems as well.

The process of the flowchart 200 starts at step 202. At step 204, a user downloads to the apparatus, the Bespoke App Store from Advertisements (Ads) posted on a browser, in a mobile application, and the like, from a Standard App store (i.e. in this case, Google Play Store), from Social Media Sharing (e.g. files/hyperlink shared in a social media application group, chat/messaging application, and the like), etc.

In the settings of some mobile operating systems, such as Android, there is an option to allow downloading of a mobile application (in the form of an apk file for Android) from an unknown source. Generally, a source for downloading mobile applications other than the standard App store, in this case Google Play Store, can be regarded as unknown. User permission has to be given to proceed with the download of a mobile application from an unknown source. In the present example, the flowchart 200 illustrates a case in which the source is an unknown source, for instance, a hyperlink provided on a url accessed via a browser. The process checks whether the user has given permission to allow downloading from an unknown source at step 206. The process cannot proceed until the user gives permission to allow the download.

At step 208, the mobile application of the Bespoke App store is downloaded. After installation, the user launches the Bespoke App store via a Graphical User Interface shown on a display of the apparatus. Alternatively, the Bespoke App store can be automatically installed and launched after the Bespoke App store is downloaded. In another example, more user control can be given and the user may be prompted to give permission for downloading, installation and launching the mobile application of the Bespoke App store respectively.

After the Bespoke App store is launched, the Bespoke App store operations 230 are as follows.

At a step 214, the user selects an improved mobile application to run. In the present example, the improved mobile application is a mobile game application.

Figure 6:
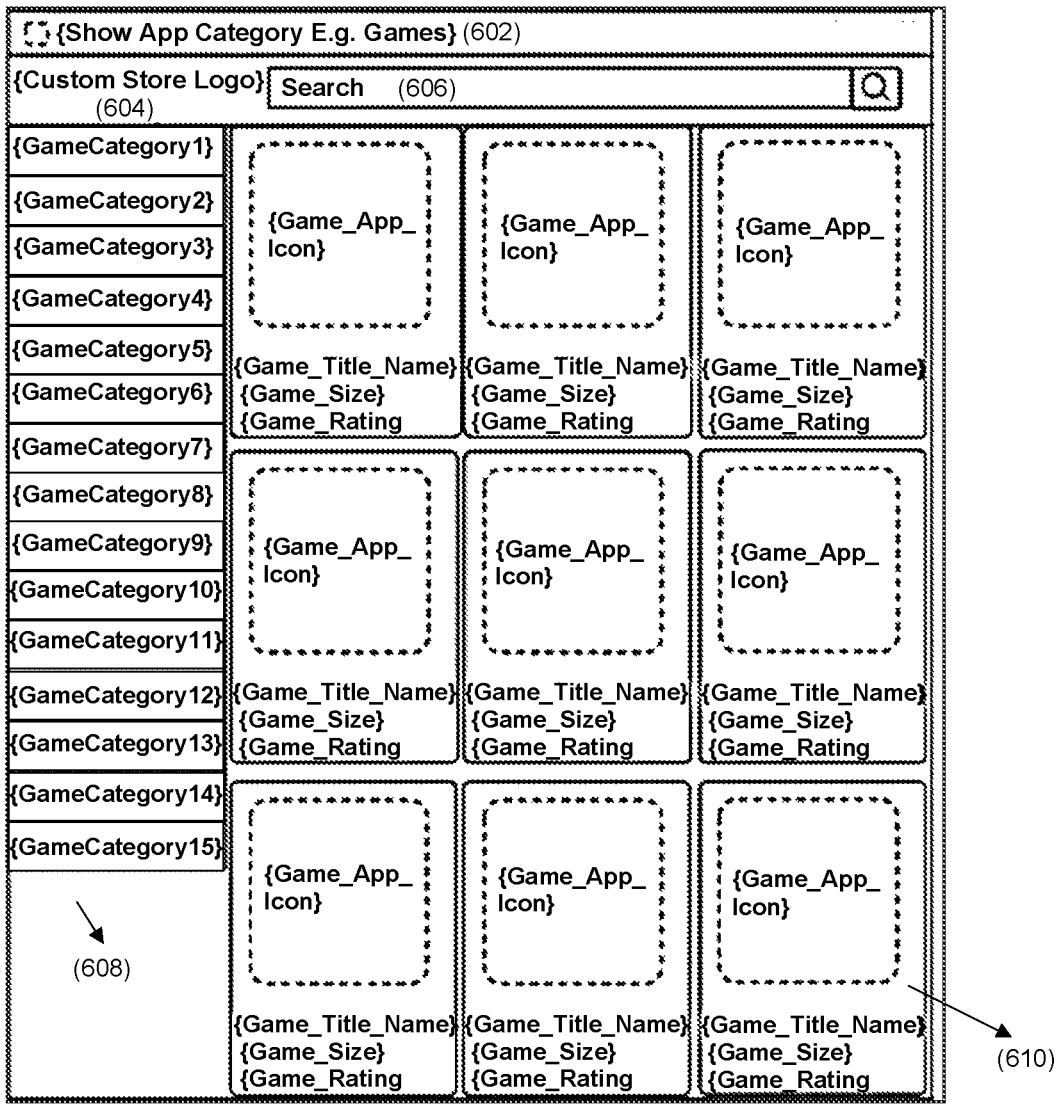
FIG. 6 shows an example of a Graphical User Interface of a mobile application of a mobile application store for accessing more than one improved mobile applications.

FIG. 6 illustrates how the user may select the improved mobile application. Specifically, FIG. 6 shows an example of a Graphical User Interface of a Bespoke App store configured for user access of one or more improved mobile applications (in short "apps"). The Bespoke App store may be configured such that all the apps shown in the Bespoke App store are improved mobile apps that have been improved via the process 100 described with reference to FIG. 1. Once launched, the Bespoke App store may display a home page or a menu screen for the user to select App category. FIG. 6 shows a page displayed after App category is selected. In the present example, a field showing the selected App category is provided at the top of the home page. In the present example, the selected App category is "Games". Logo of the Bespoke or custom App store 604 may be provided. A search bar 606 may also be provided to filter or search for certain apps, in this case, specific mobile game apps. A plurality of game categories 608 (e.g. themes, genres, etc.) may be provided in a panel for a user to select a specific game category to display one or more improved mobile game apps associated with the specific game category. Another panel may be provided to display a list 610 containing the one or more improved mobile game apps associated with the specific game category for a user to scroll and select a specific improved mobile game app.

Back to FIG. 2, after step 214, if the selected improved mobile application is not already downloaded on the apparatus, the improved mobile application is downloaded. After the download, the improved mobile application is automatically installed and launched immediately so as not to delay the running of the improved mobile application at step 216. In another example, more user control can be given and the user may be prompted to give permission for downloading, installation and launching the improved mobile application respectively.

After the improved mobile application is launched, the user proceeds to use the improved mobile application, in this case, play the mobile game at step 218. During the use of the improved mobile application, the improvements made to the improved mobile application can interact with the improved mobile application. The improvements can be provided by, for instance, the APK2 of FIG. 1, which is combined with an existing APK1. The improvements can be in the form of overlay modules 220, which will be described in detail later. These overlay modules 220 provide additional features or functionalities to the non-improved version of the mobile application.

After the user is done with the use of the improved mobile application at step 224, in this case, the user decides to end the mobile game, the process may return to a last page accessed at Bespoke App store (E.g. the page illustrated by FIG. 6) or the home page or menu screen. If the user does not select the same app or another app to run at step, the user may select to exit the Bespoke App store at step 210 and the process ends at step 212.

If the user decides not to select any improved mobile application to run after the Bespoke App store is launched at step 208, the user may select to exit the Bespoke App store at step 210 and the process ends at step 212.

Optionally, the Bespoke App store may be configured to be specialised or dedicated to specific types of improved mobile applications only, for example mobile game applications only, and other types of mobile applications are excluded.

Figure 3:
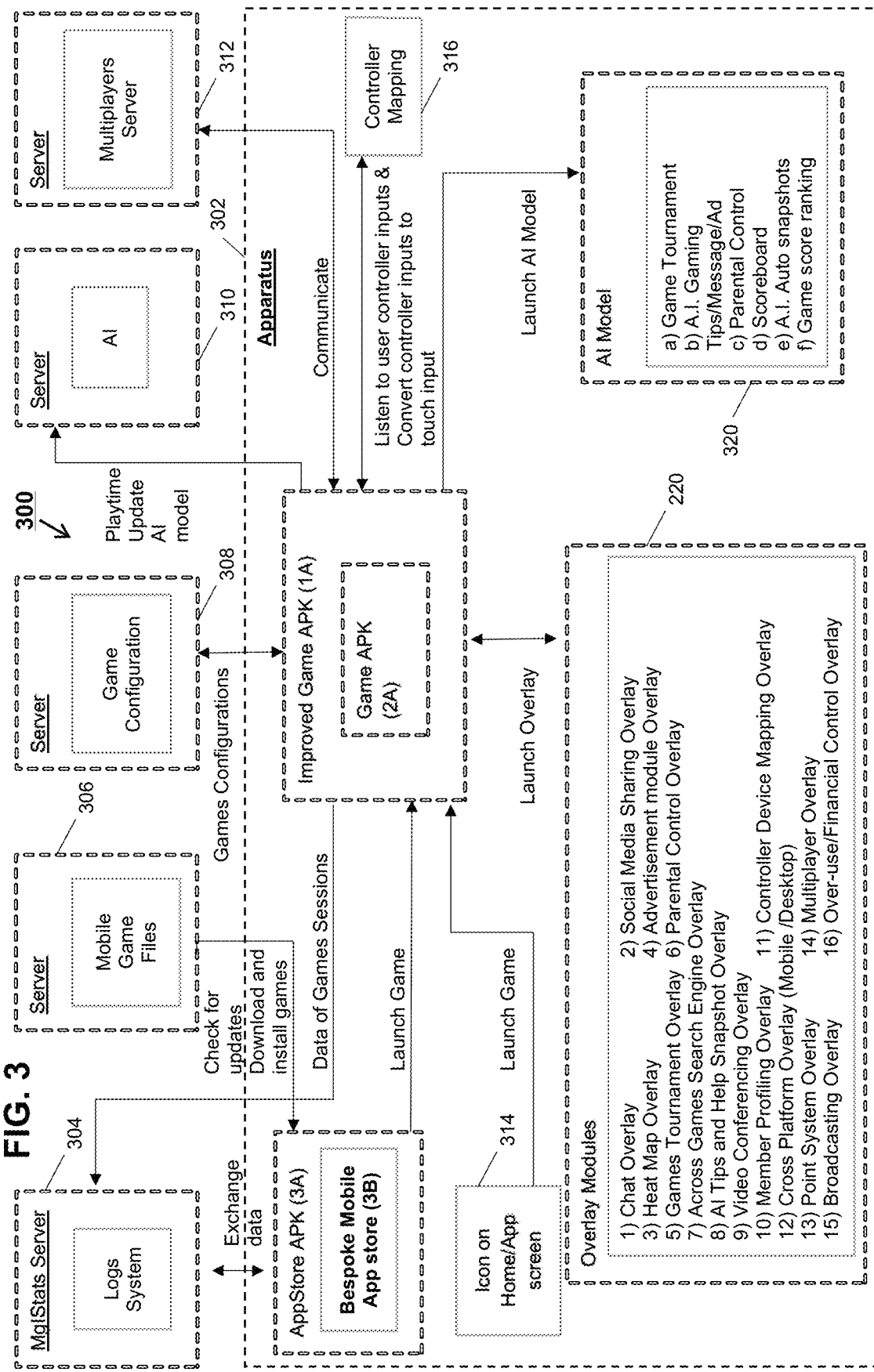
FIG. 3 shows a system architecture according to an example of the present disclosure.

FIG. 3 is a block diagram illustrating an example of a system architecture of a system 300. The system architecture comprises hardware/software components of the system 300. The system 300 enables a user selected improved mobile application to run or operate on an apparatus 302 (e.g. apparatus (A2) mentioned above). There can be a plurality of the apparatus 302 supported by the system 300. The apparatus 302 is an user device or machine used by the user to run the improved mobile application. The apparatus 302 may be a personal computer (e.g. with operating systems such as Windows and Mac OS etc.) including a desktop computer, smart television, television box (e.g. Android box), game consoles, video consoles, and the like, and mobile devices including tablet devices, smartphones, laptops, and the like. The apparatus 302 may have a mobile operating system natively configured to run mobile applications, including the improved mobile application. The apparatus 302 may also be an operating system not natively configured for running mobile applications and in this, an emulator can be provided for the apparatus 302 to run mobile applications, including the improved mobile application.

In the present example, the improved mobile application to be run is a mobile game application and the operating system of the apparatus 302 is Android. The mobile game can be a Dynamic game or a static game. A Dynamic game is of the type that players can condition their optimal actions on what other players have done in the past. In other examples, the present system 300 can be adapted accordingly to support non-gaming mobile applications. In the description as follows, the terms "user" and "player" and their plural forms are used interchangeably because the example of FIG. 3 is configured to handle mobile games.

In the present example, the improved mobile application to be run by the apparatus 302 is improved using the process 100 described with reference to FIG. 1. The improved mobile application includes an Improved Game APK 1A comprising a Game APK 2A. The Improved Game APK 1A is similar to the APK3 or S-APK3 in FIG. 1, or Output APK 808 or Signed Output APK 810 of FIG. 8. The Game APK 2A is similar to the APK1 in FIG. 1. The Game APK 2A is an existing mobile game application that has been improved and Improved Game APK 1A contains improvements to the Game APK 2A.

A user may download an AppStore Apk file 3A to the apparatus 302. This AppStore Apk file 3A may be a mobile application of a Bespoke app store 3B similar to the Bespoke app store described earlier with reference to FIGS. 2 and 6, which may be downloaded from a known source such as Google Play Store and/or an unknown source requiring user permission to download. The Bespoke app store 3B provides the user with access to one or more improved mobile game applications like the Improved Game APK 1A. The user can launch the Improved Game APK 1A to run on the apparatus 302 from the Bespoke app store 3B to play a mobile game.

If the Improved Game APK 1A is installed on the apparatus 302 previously via Google Play Store or the Bespoke app store 3B, an icon 314 of the Improved Game APK 1A representative of an executable file of the Improved Game APK 1A may be present in a home or app screen of the apparatus 302. In this case, the Improved Game APK 1A may be launched via the user selecting the icon 314.

FIG. 3 shows five servers 304, 306, 308, 310 and 312. Although five separate servers are described in the present example, it is appreciated that in other examples, they may be integrated or distributed into one or more servers, they may be configured as server instances or separate databases operated through one or more servers, they may operate based on cloud technology, and/or their functions may be performed through more than one servers.

Server 306 provides access to a database of one or more improved mobile game applications (each in the form of an apk file). Server 306 is configured to communicate with the Bespoke app store 3B. Through the Bespoke app store 3B, the user may check for updates to the one or more improved mobile game applications and may select one or more of the improved mobile game applications to be downloaded, installed and launched at the apparatus 302.

The Server 306 or another separate server may provide access for the user to download the AppStore Apk file 3A.

Server 306 or the separate server may be used to provide access to Emulator files for the apparatus 302 to download an emulator if the apparatus 302 is not natively configured to run mobile applications. An example of such emulator may be the platform described in International Patent Application No. PCT/SG2018/050243.

Server 306 or the separate server may also be used for storing images, videos, and themes. The images may be application icon and/or representative images of the one or more improved mobile applications for displaying on a display of the apparatus 302. These images may be displayed in a graphical user interface (GUI) of the Bespoke app store 3A. The videos may be promotional videos, demonstration videos and the like relating to the one or more improved mobile applications. The themes are mainly for aesthetic purposes, for instance, to enable users to customise display of the GUI of the Bespoke app store 3A. Configurations for the GUI of the Bespoke app store 3A may be stored in Server 306 as well.

Server 308 is for storing Game configurations, for instance, files relating to predetermined configuration data required to run improved mobile applications on the apparatus 302. Such predetermined configuration data may include preferred display resolution, screen orientation (landscape or portrait), and other display settings to display the graphical contents of the improved mobile application. These predetermined configuration data are applicable in the case that the apparatus 302 is not natively configured to run mobile applications, or has display settings that has to be re-configured for proper display of graphics of a mobile application. Such pre-determined configuration data may be re-configured by users according to their preference at the apparatus 302.

The Game configurations stored in Server 308 may further include controller mapping data for mapping user controls originally configured for a non-improved version of an improved mobile game application to user controls configured for other types of user input devices. For example, user controls for a mobile application are typically configured for use on a smartphone or tablet device and the user input device of such devices is typically a touchscreen. The other types of user input devices that the improved mobile game application may support can include:

Gamepad, Mouse, keyboard, Joystick, Trackball, Steering wheel (e.g. for racing games), Yoke (e.g. for flight simulation), Pedals (for racing games), Motion/gesture sensing detector, Light gun and the like (e.g. for shooting games), Rhythm game controllers, and the like.

In the present example, the controller mapping data can be made accessible to the Improved Game APK 1A to download and be used by a controller mapping module 316. The controller mapping module 316 is an added feature or functionality of the Improved Game APK 1A. The controller mapping module 316 is configured to listen to user controller inputs provided to the apparatus 302 and convert such user controller inputs to touch inputs for the original Game APK 2A. In this manner, one or more of the other types of user input devices listed above can be supported by the Improved Game APK 1A.

MglStats server 304 refers to a server for storing game player statistics. The MglStats server 304 is a log system external to the apparatus 302. MglStats stands for Mobile gaming league Statistics, which comprise player information pertaining to a Mobile gaming league such as ranking, performance, play history, gaming leagues joined for specific games, etc. The Bespoke Mobile App store 3B can provide statistics to the MglStats server 304 and retrieve statistics from the MglStats server 304 for displaying as requested by the user. The Improved Game APK 1A can be configured such that during runtime or operation, it is in communication with the MglStats server 304 to provide data including user and/or user gameplay statistics gathered from game sessions to the MglStats server 304. The Improved Game APK 1A can also be configured to retrieve statistics from the MglStats server 304 for displaying on the display of the apparatus 302 according to user request.

Server 310 is a server deployed to use Artificial Intelligence (A.I.) to monitor statuses and gather data from each improved mobile application run by the apparatus 302. A computer neural network and machine learning can be involved. The computer neural network can be of the type that involves deep learning. One or more A.I. models 320 for different purposes can be provided at the server 310 and these one or more A.I. models 320 can be updated during runtime or playtime of each improved mobile game application to further train the one or more respective A.I. model to be more accurate.

The server 310 may make use of one A.I. model to categorise images of each improved mobile application run on the apparatus. Images of each improved mobile application that is run can be categorised into predetermined categories to for specific purposes. For example, if the category of the images relates to scoring, ranking or levelling of a game of an improved mobile game application, the server 310 can process the images to determine a score, ranking or level tied to the user against scores, rankings or level of other users of the same improved mobile game application. If the determined category of the images relates to software abnormality, the server 310 can process the images to determine a state of the improved mobile game application to troubleshoot the improved mobile game application. Such troubleshooting feature can help to prevent errors or trigger reporting of malfunction or abnormality, and ensure smooth use of each improved mobile game application. Furthermore, if the determined category of the images relates to the detection of specific events in an improved mobile game application, the server 310 can make use of the detected specific events to provide functionalities such as providing multi-player support, a social networking platform, and the like to an improved mobile game application that are not previously provided in the non-improved version of the improved mobile game application.

An example of an A.I. prediction process facilitated by the server 310 is as follows:

running an improved mobile application at the apparatus;

capturing images of the improved mobile application as the improved mobile application is running (e.g. running on a mobile device such as tablet devices, smartphones, laptops, and the like) and operated by a user;

extracting image descriptors from each image of the captured images;

processing the extracted image descriptors to generate input to a model derived from a trained computer neural network (A.I. model);

processing output of the model to determine a category for the captured image from which the image descriptors are extracted;

extracting one or more features present in the captured image according to predetermined criteria for feature extraction for the category; and processing the extracted one or more features to monitor a status of the improved mobile application and/or gather data from contents of the improved mobile application.

The above A.I. prediction process is an added functionality provided by the improved mobile application, which the original non-improved mobile application does not have.

For example, a number appearing in an image at a predetermined location together with other detected markers in the image can be criteria for predicting that the image falls in a category relating to "game score extraction", and after predicting that the image falls in this category, the number may be extracted as a game score (i.e. the gathered data from the contents of the improved mobile application) via, for instance, Optical Character Recognition.

In another example, an image with specific image markers indicative of the end of an event can be criteria for predicting that the image falls in a category relating to "end of event", and after predicting that the image falls in this category, a status of the improved mobile application can be updated as "end of event" and actions pertaining to the status may then be taken by the added functionalities of the improved mobile application. An example of an action to perform during "end of event" could be to stop video capturing for a game session or to deliver a predefined message to the user.

Furthermore, an added functionality of the improved mobile application can enable a user of the improved mobile application to access a platform to engage in multi-user interactions with one or more other users accessing the same platform through one or more other applications configured to access the platform. If the mobile application being improved does not have multi-user interaction capability, such platform provides an advantage to enable multi-user interaction. The monitoring of status of the improved mobile application and/or gathering of data from the contents of the improved application is performed to identify one or more specific point in the runtime of the improved mobile application to push content to the improved mobile application. For example, if specific image markers indicate the start or end of an event, or a specific midpoint of an event, this indication can be a specific point to enable pushing of content to the improved mobile application. For example, alerts, advertisement, tips, comments, notifications, messages and/or recommendations may be displayed during the specific point during the runtime of the improved mobile game application. These alerts, advertisement, tips, comments, notifications, messages and/or recommendations may be initiated by a machine (e.g. a server or a mobile device running the improved mobile application), pre-set by a user of the improved mobile game application or by another user. This ability to identify specific point or points for pushing content to the improved mobile application in conjunction with the multi-user interaction capability provide a revolutionary user experience compared to the original non-improved mobile application. The input to the A.I. model derived from the trained computer neural network can be sent to the server 310 for processing to produce the output of the A.I. model. The server 310 can be configured to process the output of the A.I. model for determining the category for the captured image.

Specifically, each Improved mobile application can be configured to launch or activate the use of the one or more A.I. models 320 and work with the server 310 for different purposes. For example, the Improved Game APK 1A may be configured to launch and use one or more A.I. models 320 for the following purposes a) to f):

a) Game Tournament—

Example a1

One of the A.I. models at the server 310 may be configured to extract features from the images provided by an improved mobile game application during a game tournament, input the extracted features to the A.I. model, and process output of the model to detect:

user information such as user profile (name, alias, avatar etc.), level, rank, location and/or device, so as to enable identification of a player and obtain information related to the player participating in a game tournament;

game start, end, status and/or level, so as to enable determination of when to start and end a tournament and the progress of a game played; and game scoreboard and/or ranking, so as to enable determination of winnings during the game tournament.

The detected data or information can be sent to another server, such as server 312 described below, for storing and/or processing to make the aforementioned player identification, obtain the player information, make the determination of when to start and end a tournament and the progress of a game played, and/or make the determination of winnings during the game tournament.

b) A.I. Gaming Tips, Messaging and/or Advertising—

Example b1

One of the A.I. models at the server 310 may be configured to extract features from the images provided by an improved mobile game application, input the extracted features to the A.I. model, and process output of the model to determine what event and/or which point the player is at in the game. On determining the event and/or point in the game, a tip, alert, message or commentary can be delivered to the player. For instance, a text message could be sent to the player to advice how the player may play at the event and/or point to have higher chances of winning a game. During a game tournament, a message may be sent to update the player on matters relating to the tournament.

Example b2

One of the A.I. models at the server 310 may be configured to extract features from the images provided by an improved mobile game application, input the extracted features to the A.I. model, and process output of the model to (i) detect user profile (name, alias, avatar, age group, etc.), user location, user device, and/or user preferences from the settings made by the user so as to determine the kind and type of advertisements to send to the user; and to (ii) determine what event and/or which point the player is at in the game for inserting advertisements at an appropriate juncture. For instance, advertisements may be inserted during non-disturbing points that are detected, such as game start, game end, specific game event start or specific game event end.

c) Parental Control—

Example c1

One of the A.I. models at the server 310 may be configured to extract features from the content of a messaging interface provided by an improved mobile game application, input the extracted features from the content to the A.I. model, and process output of the model to determine whether the content is acceptable or unacceptable. The classification of acceptable or unacceptable content is then used for parental control configuration and settings. The content may be audio and/or text shared between users, and offensive speech and/or text may be filtered out accordingly. The content of the messaging interface may be images of the improved mobile game application during runtime. Optical Character Recognition (OCR) can be performed on these images to detect text to determine whether the text is acceptable or unacceptable.

Example c2

One of the A.I. models at the server 310 may be configured to extract features from the images provided by an improved mobile game application, input the extracted features from to the A.I. model, and process output of the model to determine whether the images is of mature or non-mature theme. The classification of mature or non-mature theme is then used for parental control configuration and settings. In this manner, games with mature theme may be filtered out accordingly.

d) Scoreboard Updating—

Example d1

One of the A.I. models at the server 310 may be configured to extract features from the images provided by an improved mobile game application, input the extracted features to the A.I. model, and process output of the model to detect when to issue and/or update scores, credits, and/or points associated with a clan, group, guild, organization, social platform and/or community to a player, who is a member of the organization, social platform and/or community.

e) A.I. Auto Snapshots—

Example e1

One of the A.I. models at the server 310 may be configured to extract features from the images provided by an improved mobile game application, input the extracted features to the A.I. model, and process output of the model to determine what event and/or which point the player is at in the game. On determining the event and/or point in the game, the improved mobile game application may be configured to automatically take snapshots at the event and/or point in the game. Alternatively, the player may be prompted whether to take a snapshot at certain points of a game. At the end of the game or at selected junctures, the player may access these snapshots. The A.I. model used for Example e1 may be the same one as that used for Example b1.

f) Game Score Ranking—

Example f1

One of the A.I. models at the server 310 may be configured to extract features from the images provided by an improved mobile game application during a game, input the extracted features to the A.I. model, and process output of the model to detect game score for determining player ranking, status and/or level in a clan, group, guild, organization, social platform and/or a community, which the player is a member of.

Server 312 is a server for supporting and/or hosting multiplayer games for improved mobile game applications. Some existing mobile games do not have a multiplayer mode. They can be processed according to the process 100 of FIG. 1 to add multiplayer capabilities. The Server 312 stores and provides the required data to provide multiplayer capabilities for the improved mobile game applications of such existing mobile games. For instance, with the help of the server 312, different players of an originally single player game can be matched and competed against one another and winnings can be set according to the performance of each player in the single player game. During a multiplayer game session hosted by the server 312, an improved mobile game application being run by a player in the multiplayer game session can be in communication with the server 312 to exchange data required for the multiplayer game session. For example, game status of a first player can be sent from an apparatus of the first player to the server 312 for delivering to and displaying at an apparatus of a second player competing with the first player. The server 312 may also store data communicated from each improved mobile game application for determining winnings at certain junctures of a game or at the end of the game.

The server 312 or one or more other servers may be used to administer user accounts of a common platform. For example, this platform may refer to a virtual world, portal, space or arena, which enables each user to login to a user account to gain access to it. User authentication may be required to gain access to the platform. Through an improved mobile application (e.g. improved via a process similar to the process 100 of FIG. 1), a user can login to access the platform to engage in multi-user interactions with one or more other users accessing the same platform through one or more other improved mobile applications.

In the present example, all the features or functionalities added to the Improved Game APK 1A through the process 100 of FIG. 1 are deemed as overlay modules 220. The reference numeral 220 of the overlay modules described in FIG. 2 is deliberately re-used as the overlay modules in FIG. 2 and FIG. 3 are similar. The original Game APK 2A do not have these features. Specifically, these overlay modules 220 are provided by the APK2 in FIG. 1.

A non-exhaustive list of 16 examples of overlay modules 220 that can be added to the Improved Game APK 1A is stated below. Although these overlay modules 318 have features specific to mobile game applications, they may be adapted to provide similar overlay modules for non-gaming mobile applications. These overlay modules 318 may be configured to provide the abovementioned common platform for game players of a plurality of improved mobile game applications, wherein each of the plurality of improved mobile games applications has been improved by the process 100 of FIG. 1 and each of the plurality of improved mobile games applications has been provided with the common overlay modules 220. The common platform provides the players of the plurality of improved mobile game applications with a community, social and/or gaming platform, and the common overlay modules 220 provides the same features or functionalities to support this community, social and/or gaming platform. Examples of multi-user interactions provided by the common platform may include users of this platform chatting with one another via a messaging interface, interacting with one another to play multiplayer games (including game tournaments) tied to a particular game title or even multiplayer games (including game tournaments) tied to several game titles, and more. More details and examples of multi-user interactions are described below.

A menu may be called out for each improved mobile game application to provide user access to the various features or functionalities stated below. The 16 examples of the overlay modules 220 are:

1) Chat Overlay (Multi-User Interaction Feature)—

This overlay provides a messaging interface to enable communication between players or users in the abovementioned common platform. The players may be using different apparatuses, wherein each of these different apparatuses is similar to the apparatus 302 in FIG. 1. The messaging interface may be accessed from each improved mobile game application (e.g. Improved Game APK 1A). The messaging interface may have the following features:

- A chat window can be displayed upon user request to facilitate messaging. In addition to text messages, files including video file, audio file and/or files of various applications in various formats may be exchanged in a chat session. Voice messages may communicated as well. That is, a chat room or group may be conducted like a tele-conference or a video conference.
- Enable in-game chat rooms or groups. This refers to a chat room or group that exists only during a specific game in play.
- Enable an App chat room or group. This refers to a chat room or group that is created or provided for an improved mobile game application. This App chat room or group exists outside of the chat room or group that exists only during a specific game in play.
- Enable public or private access for each chat room or group.
- A list of active public or private chat room or group may be displayed for players to join.
- Enable player personal profile/status to be set up. For instance, an avatar may be created.
- Enable functions like mute & unmute a chat member, block & unblock a chat member, invite a chat member, kick a chat member out a chat room or group, join or leave a chat room or group, grant or remove a chat member as an operator or administrator for a chat room or group, set up password for entry into a chat room or group, etc.
- Enable a chat room or group to be selected as a favourite chat room or group.
- Enable selection of chat members as favourites.
- Enable sending of emoticons (emotion icons).
- Enable a chat room or group to be saved for future access.
- Enable chat channels, each directed to specific topic, to be created.
- Provide different language support.
- Provide a machine translator between different languages.
- Enable configuration of Chat Window positioning and size displayed on the display of the apparatus 302.

The features of the Chat overlay may be provided to the bespoke app store 3B as well to enable users of the bespoke app store 3B to interact with one another.

2) Social Media Sharing Overlay (Multi-User Interaction Feature)—

This overlay provides social media sharing functionalities. The extent of sharing depends on the applications that are supported. For instance, the sharing can be done via a mobile chat application (Whatsapp, Telegram, Line, Facebook Messenger, Wechat, MS Teams, etc.), social networking applications (Facebook, Instagram, Pinterest, Twitter, LinkedIn, etc.), and the like.

For example, a game that is in play, to be played or already played may be shared as a video to other players of the same mobile game using the improved mobile game application of the mobile game. A player may also share images (snapshots), tips/comments, etc. pertaining to a particular game anytime during the runtime of the improved mobile game application of the game.

For games that allow sharing and/or trading of game inventory, resources, or collectibles, the Social Media Sharing overlay can enable such game inventory, resources, or collectibles to be shared or traded.

Points, tokens, and credits may be issued in the above-mentioned common platform. They may be exclusive to the common platform. These points, tokens, and credits may be rewarded, earned or collected via actions done in the common platform and they may be shared or traded. These points, tokens, and credits may be used for any in-app purchases, and/or may be used to determine level of participation, reputation and/or popularity of a player.

The Social Media Sharing overlay may enable Social Proof voting to take place as well. A Social Proof vote basically refers to a positive note or comment for a particular member (e.g. player or user) of a community.

The features of the Social Media Sharing overlay may be provided to the bespoke app store 3B as well to enable users of the bespoke app store 3B to share selected improved mobile applications to other users.

3) Heat Map Overlay (Multi-User Interaction Feature)—

This overlay enables a heat map to be generated upon user request during runtime of a mobile application. This overlay can provide a menu item named "view players online" for each improved mobile game application for user selection to call out the heat map. The heat map can be indicative of usage of a specific improved mobile application with respect to geographical location. In the heat map, a number of active users in specific geographical locations can be displayed. A list of the active users may be created and displayed upon making selection on the heat map. An active user may connect to another active user in the list by invitation and seeking permission from the active user. The features of the Heat Map overlay may be provided to the bespoke app store 3B as well to enable users of the bespoke app store 3B to access the heat map for a specific mobile game or across different mobile games selected by a user.

Figure 7:
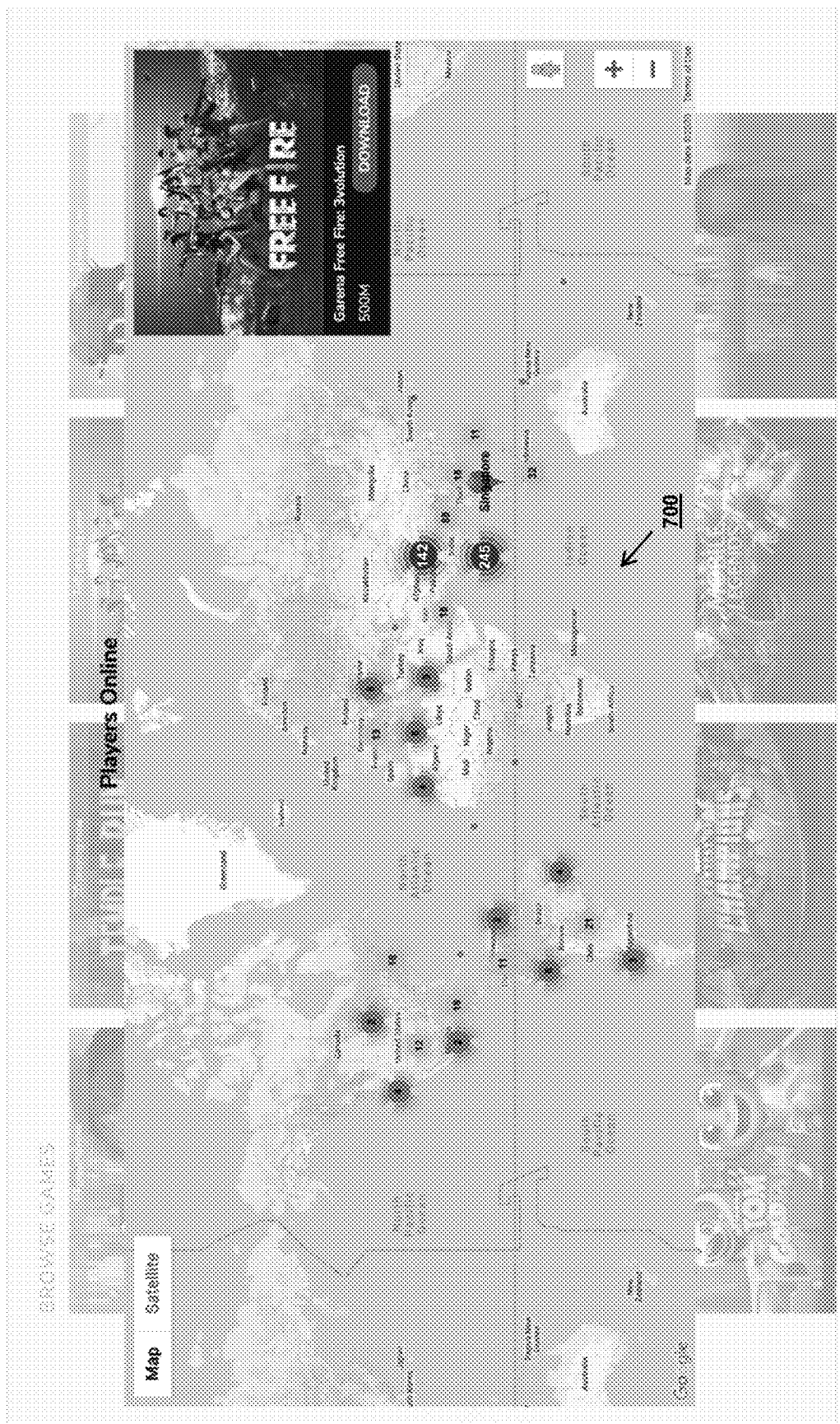
FIG. 7 shows an example of a heat map for displaying statistics pertaining to more than one improved mobile applications.

FIG. 7 further illustrates the heat map. The heat map is a feature or functionality that can be provided to the Bespoke app store 3B or added to an improved mobile application APK3 or S-APK3 described earlier with reference to FIG. 1 to FIG. 6, or the Output APK 808 or Signed Output APK 810 of FIG. 8. FIG. 7 shows a heat map 700 generated for a specific mobile game, FreeFire, to display real-time statistics of players online. A world map is generated and number of players playing the improved mobile game application of the mobile game, FreeFire are displayed at various geographical locations on the world map. In the present example, spots indicating active number of players playing in real time are displayed with higher contrast and intensity compared to spots indicating less active players. Furthermore, the higher the number of active players playing in real time will also increase the contrast and intensity of the display. For example, the numbers "142" and "245" in Asia indicative of active number of players playing in real time have highest contrast and intensity. A similar heat map can be generated for each of the other mobile games as well.

4) Advertisement Overlay (Push Content Feature)—

This overlay launches an A.I. prediction process in the background of the apparatus 302 of FIG. 3. This A.I. prediction process uses one of the A.I. models at the server 310 and works as described under Example b2 above.

As mentioned earlier, the A.I. model is used to (i) detect user information such as user profile (name, alias, avatar, age group, etc.), user location, user device, and/or user preferences from the settings made by the user, so as to determine the kind and type of advertisements to send to the user; and to (ii) determine what event and/or which point the player is at in the game for inserting advertisements at an appropriate juncture. For example, the A.I. model may classify the user to certain predefined categories based on the detected user information, and the type of advertisements associated with the predefined categories will be sent to the user accordingly. For instance, advertisements may be inserted during non-disturbing points that are detected, such as game start, game end, specific game event start or specific game event end. Once it is decided that an advertisement is to be sent to the user, the process flow is to display the advertisement (Ad) at an appropriate juncture in the runtime of the improved mobile game application, play/stream any video Ad or interactive Ad accordingly and end the Ad once it is shown. This overlay may provide an option in a graphical user interface for a user to select no displaying of advertisements.

The features of the Advertisement overlay module may be provided to the bespoke app store 3B as well to enable users of the bespoke app store 3B to receive advertisements according to the detected user information. In the case of the bespoke app store 3B, the appropriate juncture in the use of the bespoke app store 3B to insert or display advertisements can be pre-determined at the time of creation of the bespoke app store 3B.

5) Games Tournament Overlay (Multi-User Interaction Feature)—

This overlay launches an A.I. prediction process in the background of the apparatus 302 of FIG. 3. This A.I. prediction process uses one of the A.I. models at the server 310 and works as described under Example a1 above. As mentioned earlier, the A.I. model is used to detect;

user profile (name, alias, avatar etc.), level, rank, location and/or device so as to enable identification of a player and obtain information related to the player participating in a game tournament;

game start, end, status and/or level, so as to enable determination of when to start and end a tournament and the progress of a game played; and game scoreboard and/or ranking, so as to enable determination of winnings during the game tournament.

The detected data or information can be sent to another server, such as server 312, for storing and/or processing to make the aforementioned player identification, obtain the player information, make the determination of when to start and end a tournament and the progress of a game played, and/or make the determination of winnings during the game tournament.

This overlay may provide an option in a graphical user interface for a user to select to create and/or join a tournament. When such option shows up, a player can select a tournament to join or create one and invite other players to join. Thereafter, the tournament commences, the detected scores and rankings are calculated and/or tabulated, winnings may be announced, and the player can exit the tournament upon its completion.

6) Parental Control Overlay—

This overlay provides Parental Control options to a user. Game content that are deemed to be not suitable for kids can be blocked out and/or filtered out. The unsuitable game content may be decided in advance for each Improved mobile game application and this overlay will enable the blocking and/or filtering during runtime of the mobile game upon user request. Duration for gaming may be set to prevent excessive game play. Screenshot capturing may be activated and the screenshots are stored for parental access to check content accessed by kids. Blocking out may be done via blurring or adding graphics to cover the unsuitable content. Filtering out would be to remove the unsuitable content (if possible) and/or automatically make controls to proceed to exit from the display of unsuitable content. A warning message may be provided upon display of unsuitable content.

This overlay can launch an A.I. prediction process in the background of the apparatus 302 of FIG. 3. This A.I. prediction process uses one or more of the A.I. models at the server 310 and works as described under Example c1 and c2 above. Text/speech deemed to be not suitable for kids in chats, videos, and/or audio played can be tracked, and blocked out and/or filtered out. An A.I. model may be used to detect unsuitable text from text entered/received or text obtained from images for blocking and/or filtering. Optical Character Recognition (OCR) can be performed on images to detect text to determine whether the text is acceptable or unacceptable. For speech and audio played, the A.I. model may be used to detect unsuitable speech and audio played for blocking and/or filtering.

Furthermore, an A.I. model may be configured to extract features from the images provided by an improved mobile game application, input the extracted features from to the A.I. model, and process output of the model to determine whether the images is of mature or non-mature theme. The classification of mature or non-mature theme is then used to decide what needs to be blocked out and/or filtered out in a mobile game. Such classification also helps to decide which unsuitable mobile games are to be denied access when parental control setting is made to filter out such unsuitable mobile game.

The features of the parental control overlay module may be provided to the bespoke app store 3B as well to enable users of the bespoke app store 3B to block and/or filter out mobile games provided in the bespoke app store 3B that are predetermined to be unsuitable for kids.

7) Across Games Search Engine Overlay (Multi-User Interaction Feature)—

This overlay provides search functionality across a plurality of improved mobile game applications, in particular, a search engine for searching content in the abovementioned common platform is provided. Searchable items can include recommended games, past/present/future game tournaments or game sessions, user names, clan/group/guild names, game play snapshots/videos, player entered tips/messages/comments, user inventory items (See details on user inventory under Member Profiling Overlay), Social proof votes for players, A.I. created content (e.g. auto snapshots by A.I. that are categorized and/or tagged for specific purposes), any other users' created content for the common platform, and the like.

The features of the Across Games Search Engine overlay module may be provided to the bespoke app store 3B as well to enable users of the bespoke app store 3B to perform a search for content in the common platform.

8) AI Tips and Help Snapshot Overlay (Push Content Feature)—

This overlay enables alerts, tips, comments, notifications, messages and/or recommendations to be displayed during runtime of an improved mobile game application. These alerts, tips, comments, notifications, messages and/or recommendations may be initiated by a machine, by a user of the improved mobile game application or by another user.

This overlay may launch an A.I. prediction process in the background of the apparatus 302 of FIG. 3. This A.I. prediction process uses one or more of the A.I. models at the server 310 and works as described under Example b1 and e1 above.

An A.I. model may be configured to determine what event and/or which point a player is at in a game. On determining the event and/or point in the game, a tip, alert, message or commentary can be delivered to the player automatically. For instance, a text message could be sent to the player to advice how the player may play at the event and/or point to have higher chances of winning a game. During a game tournament, a message may be sent to update the player on matters relating to the tournament. Other messages/announcements (e.g. update alerts, server maintenance periods) pertaining to the abovementioned common platform may be automatically sent to a player as well.

Furthermore, on determining the event and/or point in the game, the overlay may be configured to enable the apparatus 302 to automatically take snapshots at the event and/or point in the game. The overlay may enable a player to be prompted whether to take a snapshot at certain points of a game. At the end of the game or at selected junctures, the player may access these snapshots.

This overlay may also enable split screen display during multiplayer game play. For example, through this overlay, on-screen graphics of an improved mobile application run by a first user and on-screen graphics of an improved mobile application run by a second user may be displayed concurrently in separate windows on the display of the apparatus of the first user. The first user may select a user's screen from a list for displaying alongside the on-screen graphics of the improved mobile application run by the first user.

This overlay may provide help/suggestion functions to guide and teach a user how to use an improved mobile game application.

This overlay may also enable snapshots of game frames in video or photo format to take place. This overlay may work with the Social Media Sharing Overlay to share video or snapshots to social media.

9) Video Conferencing Overlay (Multi-User Interaction Feature)—

This overlay provides video conferencing options to a player in need of scheduling, attending or holding a video conference. For example, a menu item for launching a video conference app (e.g. Zoom, MS Teams, Google Hangouts, Bluejeans, etc.). The features of the Video Conferencing overlay may be provided to the bespoke app store 3B as well to enable users of the bespoke app store 3B to schedule, hold and attend video conferences.

10) Member Profiling Overlay (Multi-User Interaction Feature)—

This overlay enable member/personal/user/player profile setup to create and edit a user account or identity for the abovementioned common platform. A window may be displayed for the setup after the overlay is activated via, for instance, a menu item selection by a user. User information like user name, alias, nickname, age or age group, user game preferences, user location, user device, avatar, background graphics/theme, and the like may be entered, edited, and created for a user profile.

This overlay enables a common user account to be accessed and be applicable across a plurality of improved mobile game applications.

A user may select a "Do not disturb" indication, which stops any notification pertaining to the common platform and/or a particular improved mobile game application to be sent to a user's apparatus 302. For instance, machine initiated game tips/alerts/messages sent during game-play may be switched off. Such "Do not disturb" indication and/or a separate "No advertisement" setting may be provided to stop receiving advertisements.

A user profile panel containing user data may be provided. In this panel, user's points, tokens and/or credits issued to the user, or earned and/or collected by the user may be displayed. A user inventory may be also be provided and be made accessible via the panel. The user inventory may include items purchase in a market place provide for the common platform. Such items may include background graphics, themes, avatar features like clothing, game items (if available for off-line storage and trading), and the like.

This overlay enables user's past activities to be logged and displayed upon user request. Clans, groups and/or guilds joined by the user may be displayed upon user request. Listings of such clans, groups and/or guilds joined for a game, an improved mobile game application, and/or a specific community may be provided. Such listings may be configured as an access point for a user to select a clan, group and/or guild to engage in community chat, and/or content creation and sharing.

This overlay may enable QR codes to be generated for a user profile to enable easy access to a user account on different apparatuses.

A user may make selections through this overlay to play specified games for certain entities such as Charity organizations, which may raise funds in the process, and select to have winnings and/or donations go to appointed organizations.

The features of the Member Profiling overlay module may be provided to the bespoke app store 3B as well to enable users of the bespoke app store 3B to create and edit user profiles from the bespoke app store 3B.

11) Controller Device Mapping Overlay—

This overlay works with the controller mapping module 316 to provide support for the use of different types of user input devices to run an improved mobile game application. This overlay can provide a user setting interface for a user to choose a user input device to support and the controller mapping module 316 will perform the user control mapping accordingly. Specifically, the controller mapping module 316 listens to user controller inputs provided to the apparatus 302 by a selected user input device, and convert such user controller inputs to touch inputs or other acceptable inputs of the game of an improved mobile game application. This overlay and the controller mapping module 316 can be integrated as one module to facilitate all controller device mapping operations. As mentioned earlier, examples of the user input device include Gamepad, Mouse, keyboard, Joystick, Trackball, Steering wheel (e.g. for racing games), Yoke (e.g. for flight simulation), Pedals, (for racing games), Motion/gesture sensing detector, Light gun and the like (e.g. for shooting games), Rhythm game controllers, and the like.

12) Cross Platform Overlay (Multi-User Interaction Feature)—

For all the 15 overlay modules described herein, they are configured to support players to interact in the abovementioned common platform using different apparatuses such as an apparatus in the form of a mobile device and/or an apparatus in the form of a device configured with an operating system, which is not configured natively to run mobile applications. Hence, depending on the apparatus and/or emulator used, there may be a need to make configurations to enable data to be communicated between the apparatus and/or emulator to be readable by one another so as to enable the added functionalities in the improved mobile application to work. A cross platform overlay may be provided to each improved mobile application to convert data generated from different apparatuses and/or emulators to comply with a common data communication protocol. There could be a step to identify an emulator, a version of an emulator, an operating system of an apparatus used by a user, a version of an operating system of an apparatus used by a user, an apparatus used by a user, and/or version/type/model of the apparatus used by a user to determine the actions to take to comply with the common data communication protocol. The data being communicated can be video/audio files, video/audio streams, text files/data, image files, and the like. Enabling a plurality of apparatuses and/or emulators to be able to communicate with one another is particularly important during multiplayer games and/or games tournament, which requires players using different apparatuses to interact with one another. Alternatively, or in addition, data communicated from one or more emulators and/or apparatuses may be adopting different data communication protocols (such as different from the common data communication protocol), and the cross platform overlay is configured to convert the different communicated data formats to a format readable to the specific emulator and/or device so that a user can also interact in the common platform using the specific emulator and/or device can also. This cross platform overlay may be a standalone module or be integrated with one or more of the other overlay modules such as those described in the present disclosure.

13) Point System Overlay (Multi-User Interaction Feature)—

This overlay manages points (or tokens, credits etc.) issued to a user account created via the Member Profiling Overlay. As mentioned above, points (or tokens, credits etc.) may be exclusive to the abovementioned common platform. A player may earn such points from amount of play time, achievements (e.g. winnings from games), amount of time engaged in messaging with other users, number of shared links (e.g. sharing done via the Social Media Sharing Overlay), content created by user (e.g. videos broadcasted, game tips provided, etc.), amount of time playing for a cause like playing for a particular Charity organization, user participation in events/tasks/actions in the common platform, and the like. Such points may be issued to clans, group or guild in addition to individual players.

This overlay may launch an A.I. prediction process in the background of the apparatus 302 of FIG. 3. This A.I. prediction process uses one or more of the A.I. models at the server 310 and may work in a similar manner as described for Example f1 above. An A.I. model may be configured to extract features from the images provided by an improved mobile game application during a game, input the extracted features to the A.I. model, and process output of the model to detect game score for determining points to issue for the winnings of a game that is played.

14) Multiplayer Overlay (Multi-User Interaction Feature)—

This overlay enables players to join or form their own game clan, group, or guild, and to join or start a multiplayer game with invitations sent to selected players. The game clan, group, or guild may be created for individual games, for a specific game session only, to be applicable across more than one games, and/or for tournaments. On top of providing game play between individual players, games may be selected to be played on a clan, group or guild level.

This overlay can be a standalone overlay module to support multiplayer games, or be integrated with the Games tournament overlay since a game tournament can also be a multiplayer game. Hence, this overlay may also launch an A.I. prediction process in the background of the apparatus 302 of FIG. 3. This A.I. prediction process uses one of the A.I. models at the server 310 and works as described under Example a1 above. The A.I. model may be used to detect:

user profile (name, alias, avatar etc.), level, rank, location and/or device so as to enable identification of a player and obtain information related to the player participating in a multi-player game, which can include a game tournament;

game start, end, status and/or level, so as to enable determination of when to start and end a multiplayer game and the progress of a game played; and game scoreboard and/or ranking, so as to enable determination of winnings.

The detected data or information can be sent to another server, such as server 312, for storing and/or processing to make the aforementioned player identification, obtain the player information, make the determination of when to start and end a multiplayer game and the progress of a game played, and/or make the determination of winnings.

15) Broadcasting Overlay (Multi-User Interaction Feature)—

This overlay enables players to stream and broadcast their game sessions while playing a single player game or a multiplayer game. The game sessions can be part of a games tournament. Video capturing can take place in the background upon user request. The video capturing can be manually activated by a player that is the player may select a first point in the runtime of a game to start video capturing and broadcasting, and a second point in the runtime of the game to end the video capturing and broadcasting. This overlay may be a menu item to enable selection of start and end of video capturing and broadcasting. Time duration of video capturing and broadcasting may be selected to provide convenience for a player to end video capturing and broadcasting. This overlay may also enable a broadcasted video by a player to be streamed to a common platform for other players of the same improved mobile game application to view. Optionally, a player may also select one or more players that are online and running the same improved mobile game application to view a video broadcast. This overlay may also be activated through other overlays such as the game tournament overlay, which may broadcast a game being played by a player to other players. During a game tournament or certain multiplayer games, the video capturing may be mandatory and/or pre-determined to start and end at certain points in the runtime of a game or tournament.

This overlay may launch an A.I. prediction process in the background of the apparatus 302 of FIG. 3, or make use of inputs from another A.I. prediction process, such as one using an A.I. model to extract features from the images provided by an improved mobile game application, input the extracted features to the A.I. model, and process output of the model to determine start and/or end of a game session, so as to determine when the video capturing in the background should start and end.

16) Over-Use and/or Financial Control Overlay—

This overlay can help to prevent over-gaming (excessive game play), over-use of application (e.g. excessive screen time) and/or excessive financial expenditure (e.g. excessive in-app purchases).

With regard to over-gaming prevention, gambling control, and/or prevention of over-use of application (e.g. excessive screen time for video watching applications), this overlay may collect game play time duration and/or use time of application based on start and end screens identified by an A.I. prediction process as follows.

This A.I. prediction process may be run in the background of the apparatus 302 of FIG. 3, or make use of inputs from another A.I. prediction process. There may be involved an A.I. model to extract features from the images provided by an improved mobile application, inputting of the extracted features to the A.I. model, and processing of output of the model to determine the start and end screens for starting and ending time collection.

Thresholds in terms of time duration can be set by users or via other overlays such as the Parental Control Overlay to cap and/or control game play time duration and/or use time of application. Alerts may be prompted at specific points during application use to remind about excessive game play and/or excessive application use prior to or after a threshold has exceeded. Settings such as to limit or cease application use may also take place after a threshold has exceeded.

Such thresholds can be set across a plurality of improved mobile applications. For example, a game or usage time duration of specified hours may be set per day or per week for a plurality of improved mobile applications. When the specified hours is up, all the plurality of improved mobile applications will cease to operate or application use will be suspended for a specified amount of time.

With regard to prevention of excessive financial expenditure, this overlay may launch an A.I. prediction process in the background of the apparatus 302 of FIG. 3, or make use of inputs from another A.I. prediction process. The A.I. prediction process may involve an A.I. model to extract features from the images provided by an improved mobile application, inputting of the extracted features to the A.I. model, and processing of output of the model to determine application screens associated with financial expenditure, so as to extract data pertaining to financial expenditure to enable control over the expenditure.

Thresholds on expenditure can be set by users or via other overlays such as the Parental Control Overlay to cap and/or control expenditure to prevent excessive financial expenditure. Alerts may be prompted at specific points during application use to remind about excessive expenditure prior to or after a threshold has exceeded. Settings such as to limit or cease application use or prevent expenditure (such as prevent access to screens for in-app purchases) may also be made after a threshold has exceeded.

Such thresholds can be set across a plurality of improved mobile applications. For example, a player's income may be set at a certain amount per month and the expenditure may be allocated in an example as follows:

Improved application A—1% of the income per day or month
Improved application B—5% of the income per day or month
Improved application C—0% (e.g. there is no cap to the income expenditure for this application)

Further examples are setting a limit on the number of daily in-app purchases, and/or suspend in-app purchase for a specified number of days if an expenditure threshold has exceeded.

Figure 4:
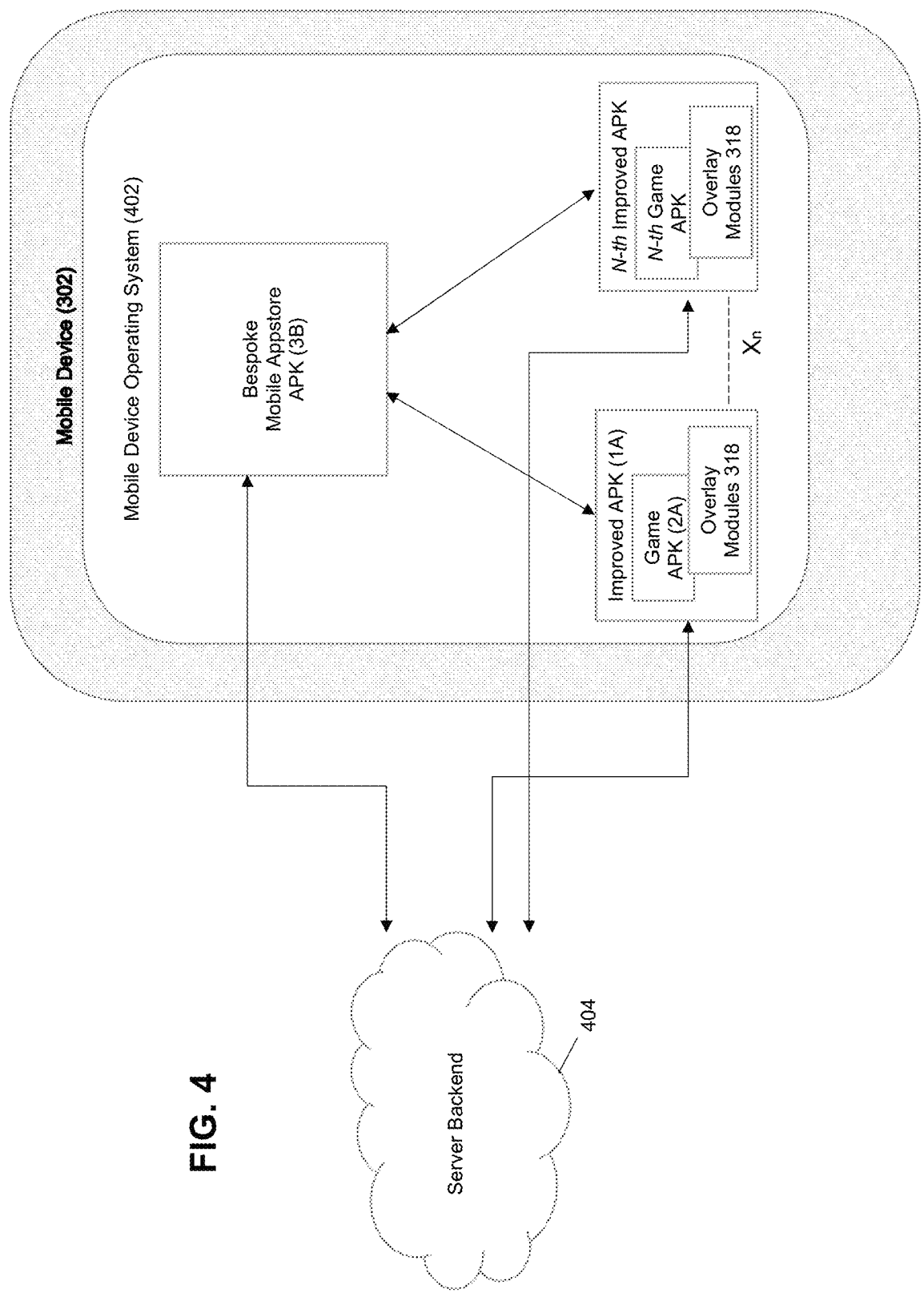
FIG. 4 shows an apparatus in the form of a mobile device operated to run an improved mobile application.

FIG. 4 illustrates an example of the apparatus 302 in the system 300 of FIG. 3. The apparatus 302 is in the form of a mobile device operated to run the Bespoke app store 3B and a plurality of improved mobile game applications. All the servers 304, 306, 308, 310 and 312 of FIG. 3, including any other required server that is not shown are regarded as server backend 404, which the apparatus 302 is in communication with to enable the system 300 to work. The apparatus 302 is configured with a mobile device operating system 402, which is Google's Android in the present example. The plurality of improved mobile applications includes the improved mobile game application, Improved Game APK 1A, which comprises the Game APK 2A and the overlay modules 318 described earlier with reference to FIG. 3. The plurality of improved mobile applications has an arbitrary $X_n$ number of improved mobile applications, which numbers from the first Improved Game APK 1A to an N-th Improved APK. The N-th Improved APK comprises a corresponding N-th Game APK and the same overlay modules 318 described earlier with reference to FIG. 3. The apparatus 302 has a mobile device operating system that is natively configured to run the Improved Game APK 1A. The Improved Game APK 1A can advantageously provide the above described A.I. features to monitor statuses and/or gather data from the Improved Game APK 1A to enable multi-user interaction and push content at specific point or points of the Improved Game APK 1A. The A.I. features for monitoring statuses and/or gather data make it possible to enable multi-user interaction and to push content. In this manner, it is possible to modify any existing mobile application or mobile game application that does not originally have features directed to multi-user interaction and/or receipt of pushed content to have these features directed to multi-user interaction and/or receipt of pushed content.

Figure 5:
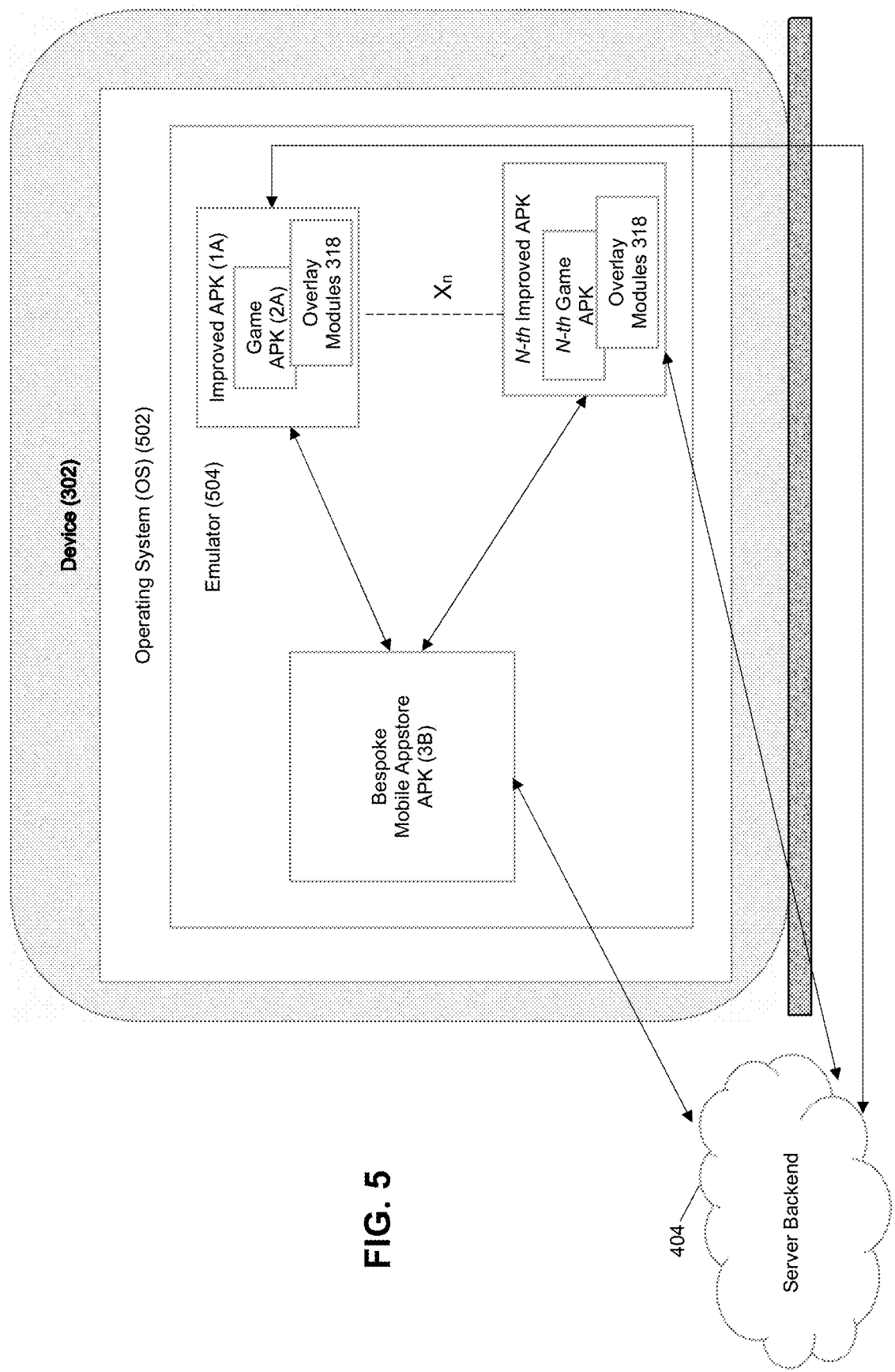
FIG. 5 shows an apparatus in the form of a device with an emulator that is operated to run an improved mobile application.

FIG. 5 illustrates another example of the apparatus 302 in the system 300 of FIG. 3. The apparatus 302 is the form of a device configured with an operating system 502, which is not configured natively to run mobile applications. In this case, the apparatus 302 is provided with an emulator 504 to facilitate the apparatus 302 to run mobile applications including the Bespoke app store 3B and a plurality of improved mobile game applications. The emulator 504 emulates the mobile device operating system, which is Google's Android in the present example to enable the running of mobile applications on the apparatus 302. All the servers 304, 306, 308, 310 and 312 of FIG. 3, including any other required server that is not shown are regarded as the server backend 404, which the apparatus 302 is in communication with to enable the system 300 to work. The plurality of improved mobile applications includes the improved mobile game application, Improved Game APK 1A, which comprises the Game APK 2A and the overlay modules 318 described earlier with reference to FIG. 3. The plurality of improved mobile applications has an arbitrary $X_n$ number of improved mobile applications, which numbers from the first Improved Game APK 1A to an N-th Improved APK. The N-th Improved APK comprises a corresponding N-th Game APK and the same overlay modules 318 described earlier with reference to FIG. 3.

In summary, examples of the present disclosure may have the following features.

A method (e.g. 100 in FIG. 1) for improving a mobile application (e.g. APK1 in FIG. 1), the method comprising steps to combine a first mobile application with software to produce an improved mobile application providing added functionalities to the first mobile application, and the steps are: unpacking a first file of a first mobile application (e.g. APK1 in FIG. 1) to obtain contents that include codes of the first mobile application (e.g. Code 1 in FIG. 1) and resource data of the first mobile application (e.g. Name space 1 in FIG. 1); setting a common name space (e.g. Name space 1 in FIG. 1) for the resource data of the first mobile application and resource data of a second mobile application (e.g. Name space 2 in FIG. 1), wherein the second mobile application is the software; assembling the codes of the first mobile application and codes of the second mobile application (e.g. Code 2 in FIG. 1); and packing the assembled codes of the first mobile application and the second mobile application (e.g. Code 3 in FIG. 1), the resource data of the first mobile application and the second mobile application (e.g. S1, D1, O1, S2A, D2A, and O2A in FIG. 1), and data of the common name space (e.g. M1 in FIG. 1) to create a file of the improved mobile application (e.g. APK3 in FIG. 1),
wherein the method further comprises:
capturing images of the improved mobile application as the improved mobile application is running;
extracting image descriptors from each image of the captured images;
processing the extracted image descriptors to generate input to a model derived from a trained computer neural network;
processing output of the model to determine a category for the captured image from which the image descriptors are extracted;
extracting one or more features present in the captured image according to predetermined criteria for feature extraction for the category; and
processing the extracted one or more features to monitor a status of the improved mobile application and/or gather data from contents of the improved mobile application.

The method may comprise unpacking a second file of the second mobile application (e.g. APK2 in FIG. 1) to obtain contents that include the codes of the second mobile application and the resource data of the second mobile application.

The method may comprise disassembling contents obtained from unpacking the second file into a human readable format to facilitate any required modification to the contents.

The method may comprise subjecting the codes of the first mobile application and the second mobile application to code signing so that a signed file of the improved mobile application (e.g. S-APK3 in FIG. 1) is created.

The codes and the resource data of the first mobile application may not be modified, and the method may comprise modifying the codes of the second mobile application to enable functions of the second mobile application to work with the first mobile application.

The codes and the resource data of the first mobile application may not be modified, and the method may comprise modifying the resource data of the second file of the second mobile application to prevent naming conflict in the common name space set up for the resource data of the first mobile application and the resource data of the second mobile application.

Data of the second file of the second mobile application may be configured to add functionalities to the first mobile application and the improved mobile application provides the added functionalities.

The method may comprise:
running a mobile application with a function of a mobile application store, to enable user access to more than one of the improved mobile application for downloading and/or updating of the more than one improved mobile applications.

The method may comprise:
providing a heat map indicative of usage of the improved mobile application with respect to geographical location.

The method may comprise:
providing parental control over use of the improved mobile application.

The method may comprise:
enabling the improved mobile application to be operable using user input devices not previously supported.

The method may comprise:
taking one or more snapshots during runtime of the improved mobile application upon determination of an event and/or point in the runtime of the improved mobile application.

In the case that the improved mobile application is a mobile game application, the method may comprise:
enabling a user of the improved mobile application to select an entity to be associated with a game to be played.

The method may comprise:
enabling data communication between the mobile device with one or more other mobile devices operated to run the file of the improved mobile application for multi-user interactions, wherein at least one of the one or more other mobile devices requires an emulator to run the file of the improved mobile application.

The method may comprise:
enabling a user to access a platform to engage in multi-user interactions with one or more other users accessing the same platform through one or more other improved mobile applications, or through one or more other applications configured to access the same platform.

The method may comprise:
enabling a user to set one or more thresholds to control application usage time duration and/or financial expenditure across a plurality of the improved mobile applications.

The method may comprise:
running the improved mobile application on a mobile device that is natively configured to run the improved mobile application without an emulator configured to emulate a mobile device operating system to run the improved mobile application.

The improved mobile application may be run on a mobile device that is natively configured to run the improved mobile application without an emulator configured to emulate a mobile device operating system to run the improved mobile application.

An apparatus (e.g. A1) for improving a mobile application (e.g. APK1 in FIG. 1), the apparatus comprising: a processor configured to execute instructions in a memory to operate the apparatus to combine a first mobile application with software to produce an improved mobile application providing added functionalities to the first mobile application, and the apparatus is operable to: unpack a first file of a first mobile application (e.g. APK1 in FIG. 1) to obtain contents that include codes of the first mobile application (e.g. Code 1 in FIG. 1) and resource data of the first mobile application (e.g. Name space 1 in FIG. 1); set a common name space (e.g. Name space 1 in FIG. 1) for the resource data of the first mobile application and resource data of a second mobile application (e.g. Name space 2 in FIG. 1), wherein the second mobile application is the software; assemble the codes of the first mobile application and codes of the second mobile application (e.g. Code 2 in FIG. 1); and pack the assembled codes of the first mobile application and the second mobile application (e.g. Code 3 in FIG. 1), the resource data of the first mobile application and the second mobile application (e.g. S1, D1, O1, S2A, D2A, and O2A in FIG. 1), and data of the common name space (e.g. M1 in FIG. 1) to create a file of an improved mobile application (e.g. APK3 in FIG. 1),
wherein the improved mobile application is configured to enable a mobile device running the improved mobile application to:
capture images of the improved mobile application as the improved mobile application is running on the mobile device;
extract image descriptors from each image of the captured images;
process the extracted image descriptors to generate input to a model derived from a trained computer neural network;

process output of the model to determine a category for the captured image from which the image descriptors are extracted;

extract one or more features present in the captured image according to predetermined criteria for feature extraction for the category; and process the extracted one or more features to monitor a status of the improved mobile application and/or gather data from contents of the improved mobile application.

The mobile device may work with a server (e.g. server 310) to use the model and process the output of the model.

The apparatus may be operable to: unpack a second file of the second mobile application (e.g. APK2 in FIG. 1) to obtain contents that include the codes of the second mobile application and the resource data of the second mobile application.

The apparatus may be operable to: disassemble contents obtained from unpacking the second file into a human readable format to facilitate any required modification to the contents.

The apparatus may be operable to: subject the codes of the first mobile application and the second mobile application to code signing so that a signed file of the improved mobile application (e.g. S-APK3 in FIG. 1) is created.

The codes and the resource data of the first mobile application may not be modified, and the apparatus may be operable to: modify the codes of the second mobile application to enable functions of the second mobile application to work with the first mobile application.

The codes and the resource data of the first mobile application may not be modified, and the apparatus may be operable to: modify the resource data of the second file of the second mobile application to prevent naming conflict in the common name space set up for the resource data of the first mobile application and the resource data of the second mobile application.

Data of the second file of the second mobile application may be configured to add functionalities to the first mobile application and the improved mobile application provides the added functionalities.

An apparatus (e.g. A2 or 302 in FIGS. 3, 4 and 5) that is configured to run the file of the improved mobile application (e.g. APK3 or S-APK3 in FIG. 1) created by the method or apparatus described above, and the apparatus may comprise a processor configured to execute instructions in a memory to operate the apparatus to run the improved mobile application. The apparatus may comprise an emulator (e.g. 504 in FIG. 5) configured to emulate a mobile device operating system to run the improved mobile application on the apparatus.

Prior to running the improved mobile application, the apparatus may be operated to run a mobile application with a function of a mobile application store (e.g. 3B in FIGS. 3, 4 and 5), to enable user access to more than one of the improved mobile application for downloading and/or updating of the more than one improved mobile applications.

An added functionality of the improved mobile application may be to provide a heat map (e.g. 700 in FIG. 7) indicative of usage of the improved mobile application with respect to geographical location.

An added functionality of the improved mobile application may be to enable parental control over use of the improved mobile application.

An added functionality of the improved mobile application may be to enable the improved mobile application to be operable using user input devices not previously supported.

An added functionality of the improved mobile application may be to enable the improved mobile application to take one or more snapshots during runtime of the improved mobile application upon determination of an event and/or point in the runtime of the improved mobile application.

The improved mobile application may be a mobile game application, and an added functionality of the improved mobile application may be to enable a user to select an entity (e.g. Charity organization) to be associated with a game to be played.

An added functionality of the improved mobile application may be to enable data communication between the mobile device with one or more other devices operated to run the file of the improved mobile application for multi-user interactions (e.g. in the case of mobile games, multi-user refers to multi-player), wherein at least one of the one or more other devices requires an emulator to run the file of the improved mobile application.

In the case that the improved mobile application is a mobile game application, an added functionality of the improved mobile application may be to enable a user to access a platform to engage in multi-user interactions with one or more other users accessing the same platform through one or more other improved mobile applications, or through one or more other applications (e.g. an emulator application emulating a mobile device operating system to run the improved mobile application) configured to access the same platform.

An added functionality of the improved mobile application may be to enable a user to set one or more thresholds to control application usage time duration and/or financial expenditure across a plurality of the improved mobile applications.

The improved mobile application may be run on a mobile device that is natively configured to run the improved mobile application without an emulator configured to emulate a mobile device operating system to run the improved mobile application.

A method for improving a mobile application, the method comprising steps to combine a first mobile application (e.g. Game APK 801 in FIG. 8) with software to produce an improved mobile application (e.g. Output APK 808 in FIG. 8 or Signed Output APK 810 in FIG. 8) providing added functionalities to the first mobile application, and the steps are:

unpacking a first file of a first mobile application to obtain contents that include codes of the first mobile application (e.g. Game Code GC1 in FIG. 8) and resource data of the first mobile application (e.g. Game Name Space GN1 in FIG. 8);

setting a common name space (e.g. Modified Name space 1A in FIG. 8) for the resource data of the first mobile application and resource data for codes containing improvements to the first mobile application (e.g. Service Namespace SN1 in FIG. 8), wherein the codes containing improvements to the first mobile application is the software;

assembling (e.g. 805 in FIG. 8) the codes of the first mobile application and the codes containing improvements to the first mobile application (e.g. Service Code SC1 in FIG. 8); and packing (e.g. 807 in FIG. 8) the assembled codes of the first mobile application and the codes containing improvements to the first mobile application, the resource data of the first mobile application and the resource data for the codes containing improvements to the first mobile application, and data of the common name space to create a file of the improved mobile application, wherein the method further comprises:

capturing images of the improved mobile application as the improved mobile application is running;

extracting image descriptors from each image of the captured images;

processing the extracted image descriptors to generate input to a model derived from a trained computer neural network;

processing output of the model to determine a category for the captured image from which the image descriptors are extracted;

extracting one or more features present in the captured image according to predetermined criteria for feature extraction for the category; and processing the extracted one or more features to monitor a status of the improved mobile application and/or gather data from contents of the improved mobile application, wherein an added functionality of the improved mobile application is to enable a user of the improved mobile application to access a platform to engage in multi-user interactions with one or more other users accessing the same platform through one or more other applications configured to access the platform, wherein the monitoring of status of the improved mobile application and/or gathering of data from the contents of the improved application is performed to identify one or more specific point in the runtime of the improved mobile application to push content to the improved mobile application, wherein the codes and the resource data of the first mobile application are not modified, and the method comprises:

modifying the codes containing improvements to the first mobile application to enable functions specified by the codes containing improvements to the first mobile application to work with the first mobile application.

The first mobile application may be a mobile game application, and the improved mobile application provides multi-player capability to the mobile game application (i.e. an added functionality of the improved mobile application is multi-player capability).

The method may comprise:

enabling a user to set one or more thresholds to control application usage time duration and/or financial expenditure across a plurality of the improved mobile applications.

An apparatus for improving a mobile application, the apparatus comprising:

a processor configured to execute instructions in a memory to operate the apparatus to combine a first mobile application (e.g. Game APK 801 in FIG. 8) with software to produce an improved mobile application (e.g. Output APK 808 in FIG. 8 or Signed Output APK 810 in FIG. 8) providing added functionalities to the first mobile application, and the apparatus is operable to:

unpack a first file of a first mobile application to obtain contents that include codes of the first mobile application (e.g. Game Code GC1 in FIG. 8) and resource data of the first mobile application (e.g. Game Name Space GN1 in FIG. 8);

set a common name space (e.g. Modified Name space 1A in FIG. 8) for the resource data of the first mobile application and resource data for codes containing improvements to the first mobile application (e.g. Service Namespace SN1 in FIG. 8), wherein the codes containing improvements to the first mobile application is the software;

assemble (e.g. 805 in FIG. 8) the codes of the first mobile application and the codes containing improvements to the first mobile application (e.g. Service Code SC1 in FIG. 8); and pack (e.g. 807 in FIG. 8) the assembled codes of the first mobile application and the codes containing improvements to the first mobile application, the resource data of the first mobile application and the resource data for the codes containing improvements to the first mobile application, and data of the common name space to create a file of the improved mobile application, wherein the improved mobile application is configured to enable a mobile device running the improved mobile application to:

capture images of the improved mobile application as the improved mobile application is running on the mobile device;

extract image descriptors from each image of the captured images;

processing the extracted image descriptors to generate input to a model derived from a trained computer neural network;

process output of the model to determine a category for the captured image from which the image descriptors are extracted;

extract one or more features present in the captured image according to predetermined criteria for feature extraction for the category; and process the extracted one or more features to monitor a status of the improved mobile application and/or gather data from contents of the improved mobile application, wherein an added functionality of the improved mobile application is to enable a user of the improved mobile application to access a platform to engage in multi-user interactions with one or more other users accessing the same platform through one or more other applications configured to access the platform, wherein the monitoring of status of the improved mobile application and/or gathering of data from the contents of the improved application is performed to identify one or more specific point in the runtime of the improved mobile application to push content to the improved mobile application, wherein the codes and the resource data of the first mobile application are not modified, and the apparatus is operable to:

modify the codes containing improvements to the first mobile application to enable functions specified by the codes containing improvements to the first mobile application to work with the first mobile application.

The first mobile application may be a mobile game application, and the improved mobile application provides multi-player capability to the mobile game application (i.e. an added functionality of the improved mobile application is multi-player capability).

The improved mobile application may enable a user to set one or more thresholds to control application usage time duration and/or financial expenditure across a plurality of the improved mobile applications.

In the specification and claims, unless the context clearly indicates otherwise, the term "comprising" has the non-exclusive meaning of the word, in the sense of "including at least" rather than the exclusive meaning in the sense of "consisting only of". The same applies with corresponding grammatical changes to other forms of the word such as "comprise", "comprises" and so on.

While the invention has been described in the present disclosure in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for improving a mobile application, the method comprising steps to combine a first mobile application with software to produce an improved mobile application providing added functionalities to the first mobile application, and the steps are:
    unpacking a first file of the first mobile application to obtain contents that include codes of the first mobile application and resource data of the first mobile application;
    setting a common name space for the resource data of the first mobile application and resource data of a second mobile application, wherein the second mobile application is the software;
    assembling the codes of the first mobile application and codes of the second mobile application; and
    packing the assembled codes of the first mobile application and the second mobile application, the resource data of the first mobile application, the resource data of the second mobile application, and data of the common name space to create a file of the improved mobile application,
    wherein data of a second file of the second mobile application are configured to cause the improved mobile application to enable:
    capturing images of the improved mobile application as the improved mobile application is running;
    extracting image descriptors from each image of the captured images;
    processing the extracted image descriptors to generate input to a model derived from a trained computer neural network;
    processing output of the model to determine a category for the captured image from which the image descriptors are extracted;
    extracting one or more features present in the captured image according to predetermined criteria for feature extraction for the category; and
    processing the extracted one or more features to monitor a status of the improved mobile application and/or gather data from contents of the improved mobile application,
    wherein the extracted one or more features are processed to identify one or more specific points in the runtime of the improved mobile application to push content to the improved mobile application,
    wherein the data of the second file of the second mobile application are configured to add functionalities to the first mobile application and the improved mobile application provides the added functionalities.

2. The method as claimed in claim 1, wherein the method comprises:
    unpacking the second file of the second mobile application to obtain contents that include the codes of the second mobile application and the resource data of the second mobile application.

3. The method as claimed in claim 2, wherein the method comprises:
    disassembling the contents obtained from unpacking the second file into a human readable format to facilitate any required modification to the contents obtained from unpacking the second file.

4. The method as claimed in claim 1, wherein the method comprises:
    subjecting the codes of the first mobile application and the second mobile application to code signing so that a signed file of the improved mobile application is created.

5. The method as claimed in claim 1, wherein the codes and the resource data of the first mobile application are not modified, and the method comprises:
    modifying the codes of the second mobile application to enable functions of the second mobile application to work with the first mobile application.

6. The method as claimed in claim 1, wherein the codes and the resource data of the first mobile application are not modified, and the method comprises:
    modifying the resource data of the second mobile application to prevent naming conflict in the common name space set up for the resource data of the first mobile application and the resource data of the second mobile application.

7. The method as claimed in claim 1, wherein the method comprises:
    running a mobile application with a function of a mobile application store to enable user access to one or more improved mobile applications for downloading and/or updating of the one or more improved mobile applications.

8. The method as claimed in claim 1, wherein one of the added functionalities enables:
    providing a heat map indicative of usage of the improved mobile application with respect to geographical location.

9. The method as claimed in claim 1, wherein one of the added functionalities enables:
    providing parental control over use of the improved mobile application.

10. The method as claimed in claim 1, wherein the method comprises:
    enabling the improved mobile application to be operable using user input devices not previously supported.

11. The method as claimed in claim 1, wherein one of the added functionalities enables:
    taking one or more snapshots during the runtime of the improved mobile application upon determination of an event and/or point in the runtime of the improved mobile application.

12. The method as claimed in claim 1, wherein in case that the improved mobile application is a mobile game application, the method comprises:
    enabling a user of the improved mobile application to select an entity to be associated with the mobile game application to be played.

13. The method as claimed in claim 1, wherein one of the added functionalities enables:
    enabling data communication between a mobile device with one or more other mobile devices operated to run the file of the improved mobile application for multi-user interactions, wherein at least one of the one or more other mobile devices requires an emulator to run the file of the improved mobile application.

14. The method as claimed in claim 1, wherein one of the added functionalities enables:
   enabling a user to access a platform to engage in multi-user interactions with one or more other users accessing the platform through one or more other improved mobile applications or through one or more other applications configured to access the platform.

15. The method as claimed in claim 1, wherein one of the added functionalities enables:
   enabling a user to set one or more thresholds to control application usage time duration and/or financial expenditure across a plurality of improved mobile applications.

16. The method as claimed in claim 1, wherein one of the added functionalities enables:
   running the improved mobile application on a mobile device that is natively configured to run the improved mobile application without an emulator configured to emulate a mobile device operating system to run the improved mobile application.

17. An apparatus for improving a mobile application, the apparatus comprising:
   a processor; and
   a memory storing instructions, the instructions executed by the processor to operate the apparatus to combine a first mobile application with software to produce an improved mobile application providing added functionalities to the first mobile application, and the apparatus is operable to:
   unpack a first file of a first mobile application to obtain contents that include codes of the first mobile application and resource data of the first mobile application;
   set a common name space for the resource data of the first mobile application and resource data of a second mobile application, wherein the second mobile application is the software;
   assemble the codes of the first mobile application and codes of the second mobile application; and
   pack the assembled codes of the first mobile application and the second mobile application, the resource data of the first mobile application, the resource data of the second mobile application, and data of the common name space to create a file of the improved mobile application,
   wherein the codes of the second mobile application are configured to enable a mobile device running the improved mobile application to:
   capture images of the improved mobile application as the improved mobile application is running on the mobile device;
   extract image descriptors from each image of the captured images;
   process the extracted image descriptors to generate input to a model derived from a trained computer neural network;
   process output of the model to determine a category for the captured image from which the image descriptors are extracted;
   extract one or more features present in the captured image according to predetermined criteria for feature extraction for the category; and
   process the extracted one or more features to monitor a status of the improved mobile application and/or gather data from contents of the improved mobile application, wherein the extracted one or more features are processed to identify one or more specific points in the runtime of the improved mobile application to push content to the improved mobile application,
   wherein the codes of the second mobile application are configured to add functionalities to the first mobile application and the improved mobile application provides the added functionalities.

18. The apparatus as claimed in claim 17, wherein the apparatus is operable to:
   unpack a second file of the second mobile application to obtain contents that include the codes of the second mobile application and the resource data of the second mobile application.

19. The apparatus as claimed in claim 18, wherein the apparatus is operable to:
   disassemble the contents obtained from unpacking the second file into a human readable format to facilitate any required modification to the contents obtained from unpacking the second file.

20. The apparatus as claimed in claim 17, wherein the apparatus is operable to:
   subject the codes of the first mobile application and the second mobile application to code signing so that a signed file of the improved mobile application is created.

21. The apparatus as claimed in claim 17, wherein the codes and the resource data of the first mobile application are not modified, and the apparatus is operable to:
   modify the codes of the second mobile application to enable functions of the second mobile application to work with the first mobile application.

22. The apparatus as claimed in claim 17, wherein the codes and the resource data of the first mobile application are not modified, and the apparatus is operable to:
   modify the resource data of the second mobile application to prevent naming conflict in the common name space set up for the resource data of the first mobile application and the resource data of the second mobile application.

23. The apparatus as claimed in claim 17, wherein prior to running the improved mobile application on the mobile device, the mobile device is operated to run a mobile application with a function of a mobile application store to enable user access to one or more improved mobile applications for downloading and/or updating of the one or more improved mobile applications.

24. The apparatus as claimed in claim 17, wherein an added functionality of the improved mobile application is to provide a heat map indicative of usage of the improved mobile application with respect to geographical location.

25. The apparatus as claimed in claim 17, wherein an added functionality of the improved mobile application is to enable parental control over use of the improved mobile application.

26. The apparatus as claimed in claim 17, wherein an added functionality of the improved mobile application is to enable the improved mobile application to be operable using user input devices not previously supported.

27. The apparatus as claimed in claim 17, wherein an added functionality of the improved mobile application is to enable the improved mobile application to take one or more snapshots during runtime of the improved mobile application upon determination of an event and/or point in the runtime of the improved mobile application.

28. The apparatus as claimed in claim 17, wherein in case that the improved mobile application is a mobile game application, an added functionality of the improved mobile application is to enable a user to select an entity to be associated with the mobile game application to be played.

29. The apparatus as claimed in claim 17, wherein an added functionality of the improved mobile application is to enable data communication between the mobile device with one or more other mobile devices operated to run the file of the improved mobile application for multi-user interactions, wherein at least one of the one or more other mobile devices requires an emulator to run the file of the improved mobile application.

30. The apparatus as claimed in claim 17, wherein in case that the improved mobile application is a mobile game application, an added functionality of the improved mobile application is to enable a user to access a platform to engage in multi-user interactions with one or more other users accessing the platform through one or more other improved mobile applications or through one or more other applications configured to access the platform.

31. The apparatus as claimed in claim 17, wherein an added functionality of the improved mobile application is to enable a user to set one or more thresholds to control application usage time duration and/or financial expenditure across a plurality of improved mobile applications.

32. The application as claimed in claim 17, wherein the improved mobile application is to be run on the mobile device that is natively configured to run the improved mobile application without an emulator configured to emulate a mobile device operating system to run the improved mobile application.

33. A method for improving a mobile application, the method comprising steps to combine a first mobile application with software to produce an improved mobile application providing added functionalities to the first mobile application, and the steps are:
  unpacking a first file of a first mobile application to obtain contents that include codes of the first mobile application and resource data of the first mobile application;
  setting a common name space for the resource data of the first mobile application and resource data for codes containing improvements to the first mobile application, wherein the codes containing the improvements to the first mobile application is the software;
  assembling the codes of the first mobile application and the codes containing the improvements to the first mobile application; and
  packing the assembled codes of the first mobile application and the codes containing the improvements to the first mobile application, the resource data of the first mobile application and the resource data for the codes containing the improvements to the first mobile application, and data of the common name space to create a file of the improved mobile application,
  wherein the codes containing the improvements to the first mobile application are configured to cause the improved mobile application to enable:
  capturing images of the improved mobile application as the improved mobile application is running;
  extracting image descriptors from each image of the captured images;
  processing the extracted image descriptors to generate input to a model derived from a trained computer neural network;
  processing output of the model to determine a category for the captured image from which the image descriptors are extracted;
  extracting one or more features present in the captured image according to predetermined criteria for feature extraction for the category; and
  processing the extracted one or more features to monitor a status of the improved mobile application and/or gather data from contents of the improved mobile application,
  wherein the codes containing improvements to the first mobile application are configured to add functionalities to the first mobile application and the improved mobile application provides the added functionalities,
  wherein an added functionality of the improved mobile application is to enable a user of the improved mobile application to access a platform to engage in multi-user interactions with one or more other users accessing the platform through one or more other applications configured to access the platform,
  wherein the extracted one or more features are processed to identify one or more specific points in the runtime of the improved mobile application to push content to the improved mobile application,
  wherein the codes and the resource data of the first mobile application are not modified, and the method comprises:
  modifying the codes containing the improvements to the first mobile application to enable functions specified by the codes containing the improvements to the first mobile application to work with the first mobile application.

34. The method as claimed in claim 33, wherein the first mobile application is a mobile game application, and the improved mobile application provides multi-player capability to the mobile game application.

35. The method as claimed in claim 33, wherein one of the added functionalities enables:
  enabling the user to set one or more thresholds to control application usage time duration and/or financial expenditure across a plurality of improved mobile applications.

36. An apparatus for improving a mobile application, the apparatus comprising:
  a processor; and
  a memory storing instructions, the instructions executed by the processor to operate the apparatus to combine a first mobile application with software to produce an improved mobile application providing added functionalities to the first mobile application, and the apparatus is operable to:
  unpack a first file of a first mobile application to obtain contents that include codes of the first mobile application and resource data of the first mobile application;
  set a common name space for the resource data of the first mobile application and resource data for codes containing improvements to the first mobile application, wherein the codes containing the improvements to the first mobile application is the software;
  assemble the codes of the first mobile application and the codes containing the improvements to the first mobile application; and
  pack the assembled codes of the first mobile application and the codes containing the improvements to the first mobile application, the resource data of the first mobile application and the resource data for the codes containing the improvements to the first mobile application, and data of the common name space to create a file of the improved mobile application, wherein the codes containing the improvements to the first mobile application are configured to enable a mobile device running the improved mobile application to:

capture images of the improved mobile application as the improved mobile application is running on the mobile device;

extract image descriptors from each image of the captured images;

processing the extracted image descriptors to generate input to a model derived from a trained computer neural network;

process output of the model to determine a category for the captured image from which the image descriptors are extracted;

extract one or more features present in the captured image according to predetermined criteria for feature extraction for the category; and process the extracted one or more features to monitor a status of the improved mobile application and/or gather data from contents of the improved mobile application, wherein the codes containing improvements to the first mobile application are configured to add functionalities to the first mobile application and the improved mobile application provides the added functionalities, wherein an added functionality of the improved mobile application is to enable a user of the improved mobile application to access a platform to engage in multi-user interactions with one or more other users accessing the platform through one or more other applications configured to access the platform, wherein the extracted one or more features are processed to identify one or more specific points in the runtime of the improved mobile application to push content to the improved mobile application, wherein the codes and the resource data of the first mobile application are not modified, and the apparatus is operable to:

modify the codes containing the improvements to the first mobile application to enable functions specified by the codes containing the improvements to the first mobile application to work with the first mobile application.

37. The apparatus as claimed in claim 36, wherein the first mobile application is a mobile game application, and the improved mobile application provides multi-player capability to the mobile game application.

38. The apparatus as claimed in claim 36, wherein one of the added functionalities enables the user to set one or more thresholds to control application usage time duration and/or financial expenditure across a plurality of improved mobile applications.

* * * * *